United States Patent [19]

Matsumoto

[11] Patent Number: 5,623,904
[45] Date of Patent: Apr. 29, 1997

[54] AIR-ASSISTED FUEL INJECTION SYSTEM

[75] Inventor: Hiromitsu Matsumoto, Iwata, Japan

[73] Assignee: Yamaha Hatsudoki Kabushiki Kaisha, Iwata, Japan

[21] Appl. No.: 442,196

[22] Filed: May 16, 1995

[51] Int. Cl.⁶ .......................... F02D 41/08; F02M 23/06
[52] U.S. Cl. ...................... 123/339.23; 123/585
[58] Field of Search .................. 123/308, 339.14, 123/339.25, 306, 432, 531, 585, 339.19, 339.23

[56] References Cited

U.S. PATENT DOCUMENTS

| | | | |
|---|---|---|---|
| 4,628,879 | 12/1986 | Futakuchi | 123/308 |
| 4,714,063 | 12/1987 | Oda et al. | 123/308 |
| 5,150,691 | 9/1992 | Imajo | 123/531 |
| 5,211,682 | 5/1993 | Kadowaki et al. | 123/531 |
| 5,220,899 | 6/1993 | Ikebe et al. | 123/531 |
| 5,224,458 | 7/1993 | Okada et al. | 123/531 |
| 5,385,133 | 1/1995 | Ikuta et al. | 123/531 |
| 5,441,032 | 8/1995 | Ikuta et al. | 123/531 |

FOREIGN PATENT DOCUMENTS

| | | |
|---|---|---|
| 58-204952 | 11/1983 | Japan. |
| 6317237 | 11/1994 | Japan. |

*Primary Examiner*—Willis R. Wolfe
*Attorney, Agent, or Firm*—Knobbe, Martens, Olson & Bear LLP

[57] ABSTRACT

A number of embodiments of induction systems for internal combustion engines having fuel injector which spray fuel into the intake passages serving the individual combustion chambers. An arrangement is provided for injecting auxiliary air into the intake passages at atmospheric pressure. The timing and duration of air injection is varied so as to reduce pumping losses, control internal EGR, induce turbulence in the combustion chamber, control idle speed and to atomize the fuel injected by the fuel injectors, and, if desired, redirect it. Various valving and timing arrangements are disclosed whereby the duration and timing of the air injection can be controlled. In addition, embodiments are disclosed having insert pieces through which the fuel is injected and redirected by the air injected.

61 Claims, 14 Drawing Sheets

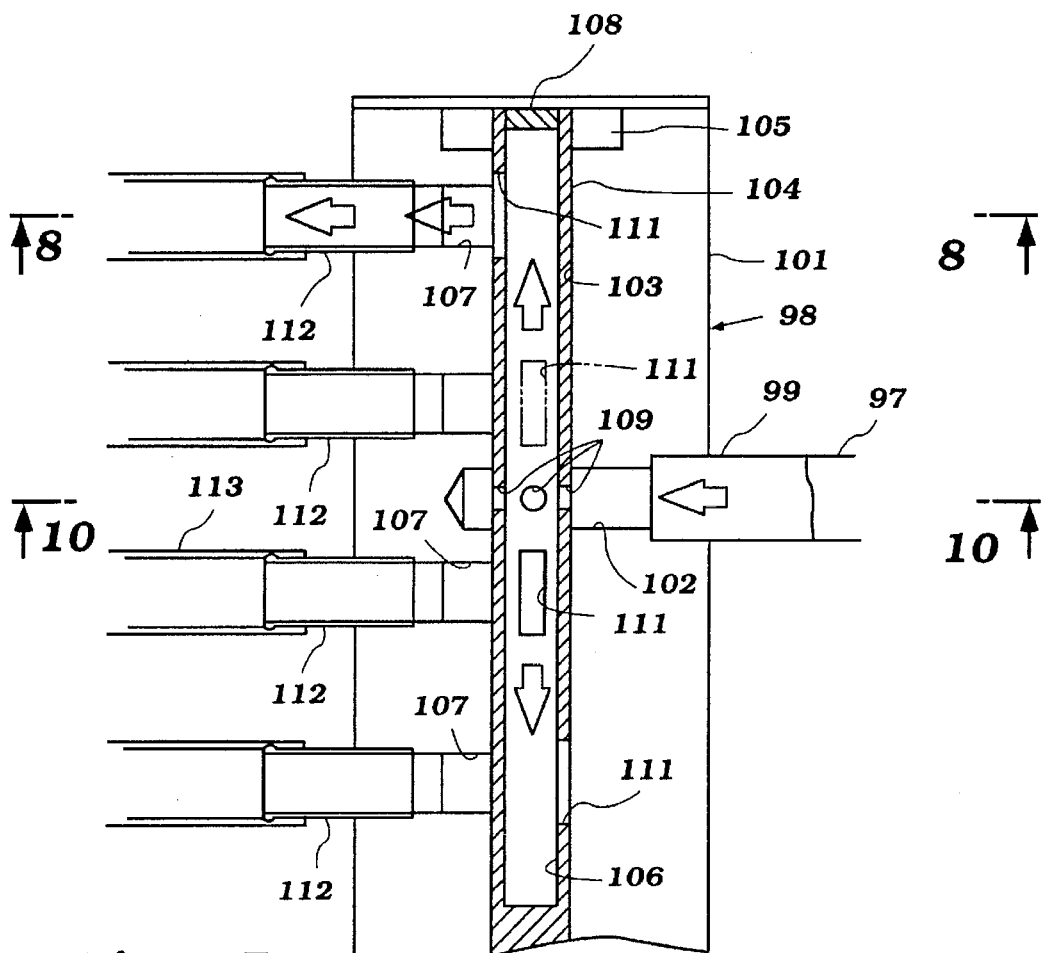
Figure 7
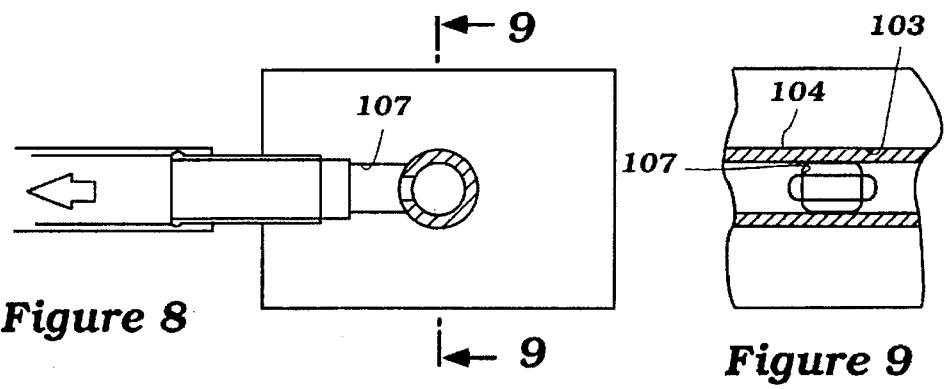
Figure 8
Figure 9
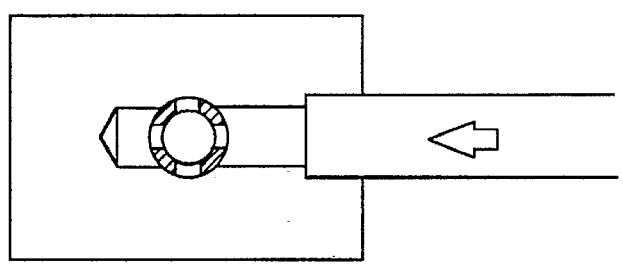
Figure 10

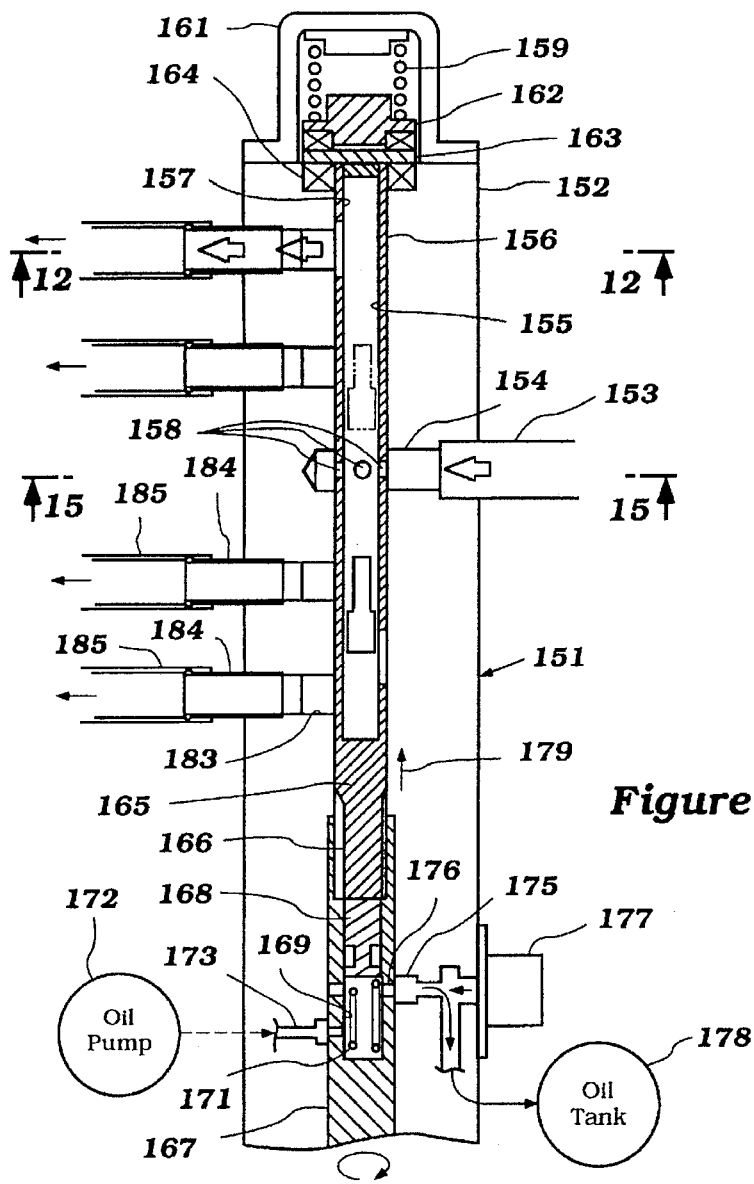
*Figure 11*
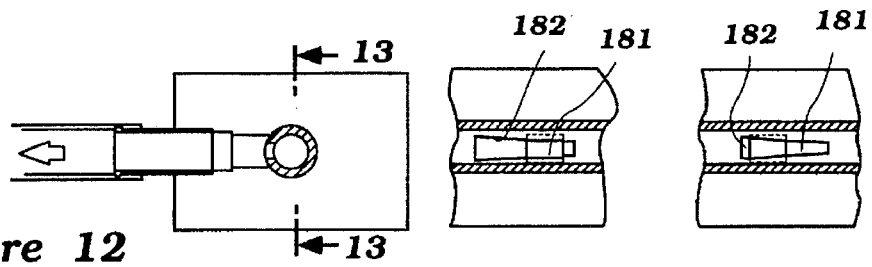
*Figure 12*     *Figure 13*   *Figure 14*
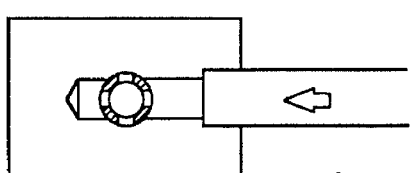
*Figure 15*

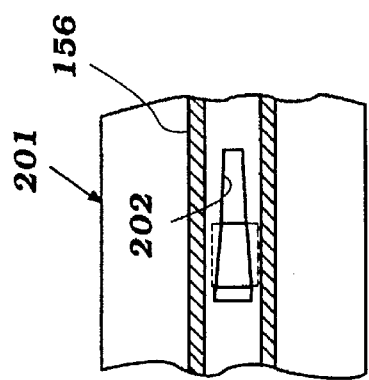
Figure 18
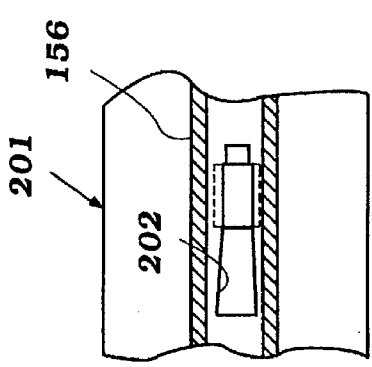
Figure 17
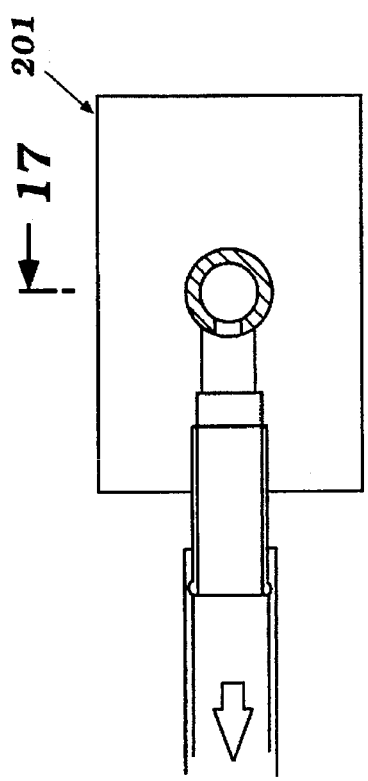
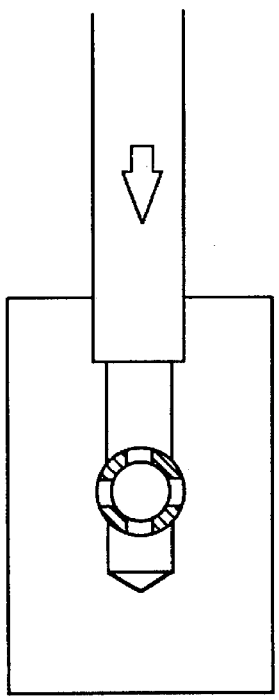
Figure 16

AIR-ASSISTED FUEL INJECTION SYSTEM

BACKGROUND OF THE INVENTION

This invention relates to an induction system for an engine and more particularly to an air assisted fuel injection system for engines.

The use of fuel injection systems is becoming relatively commonplace, particularly in automotive applications. Fuel injection offers greater control of the fuel-air mixture than carburetors and thus offers improvements in both fuel economy and exhaust emission control. The fuel injector may inject fuel either directly into the combustion chamber or into the induction passage for induction along with the intake air into the combustion chamber. Regardless of which system is employed, it is desirable that the fuel delivered by the fuel injector is well atomized and mixed with the air.

Systems have been proposed wherein air under high pressure is injected along with the fuel. These systems are thought to improve fuel dispersion and atomization. However, the systems proposed for this purpose require relatively high air pressures and hence the engine must be provided with an air compressor, a drive for the air compressor and in many instances, regulation units for regulating the air pressure. The complexity of these systems at many times offsets their advantages.

Another type of system has been proposed, particularly for induction system injection, wherein air at substantially atmospheric pressure is employed in conjunction with the fuel injector to disperse and atomize the fuel. For example, if the fuel injector is positioned in the induction system close to the engine intake port, the fuel is injected frequently at a time when the air pressure in the intake port is substantially less than atmospheric. Thus, if atmospheric air can be introduced in proximity to the fuel injector, this air will be at a higher pressure than the surrounding air and the fuel can be dispersed and atomized.

Most of the systems proposed for this purpose have had substantial limitations. For example, if the system is employed in engines having multiple cylinders, the air assist is obtained from a manifold that interconnects all of the cylinders and hence the amount of air available per cylinder is substantially reduced.

In order to avoid this problem, distributor valves have been proposed so that air will be introduced at the cylinders in sequence. This increases the amount of air that is available, but has other disadvantages and limits the applicability of the system to meet varying conditions.

It is, therefore, a principal object of this invention to provide an improved air-assisted injection system.

It is a further object of this invention to provide an improved distributor valve for an air-assisted fuel injection system.

The air-assisted fuel injection systems previously proposed have been utilized for only the single purpose aforenoted. That is, the air assist has been employed only for the purpose of atomizing and mixing the fuel with the air. However, in accordance with a number of features of this invention, it has been discovered that the assist air may be utilized for a variety of additional purposes.

For example, it is possible through the use of air assist to vary the air assist and the way the air is added so as to control the direction at which the fuel charge enters the combustion chamber.

It is, therefore, a still further object of this invention to provide an air-assisted fuel injection system wherein the air assist is employed for controlling the direction of fuel flow into the combustion chamber of the engine.

In addition to controlling the direction of fuel flow, the air assist may be employed for achieving results in addition to the control and dispersion of the fuel. For example, with conventional engine induction systems in normally aspirated engines, there is a lag in the time period between when the intake valve opens and the intake charge actually flows into the combustion chamber. This is because the air in the induction passage is relatively stationary at the time the intake valve opens and it must be accelerated to a velocity to cause it to flow into the combustion chamber. This gives rise to loss of volumetric efficiency and pumping losses.

In accordance with another object of the invention, an air assist system is employed for introducing air into the combustion chamber immediately upon opening of the intake valve so as to avoid pumping losses and improve volumetric efficiency.

Closely related to the aforenoted problem is a condition which results in what is referred to as "internal EGR" (exhaust gas recirculation). Because of the fact that there is an overlap between the opening of the intake valve and the closing of the exhaust valve, the pressure in the combustion chamber may be higher than atmospheric at the time when the intake valve opens. Thus, rather than having a charge enter the combustion chamber through the intake valve, some of the exhaust gases may flow into the induction system through the open intake valve. As the pressure in the cylinder decreases, the charge which is drawn into the combustion chamber constitutes a fairly large percentage of exhaust gas and hence a condition a condition known as internal EGR exists. This obviously can be detrimental to running under some characteristics.

Therefore, it is a still further object of this invention to provide an air-assisted system for an engine wherein internal EGR may be controlled by introducing air at atmospheric pressure in the intake passage at the time the intake valve is open and when there is an overlap between the opening of the intake valve and the closing of the exhaust valve.

Another condition which presents difficulties in obtaining good engine performance is at idling. When the engine idles, the amount of air inducted is relative small and also is at a relatively low velocity. This causes a substantial reduction in turbulence in the combustion chamber and slow combustion. This, in turn, substantially reduces fuel economy and deteriorates exhaust emission control.

It is, therefore, a still further object of this invention to improve the idle operation of an engine by supplying a substantial portion of the idle air charged through the air assist system.

Normally the idle speed of an engine is controlled at least in part by either varying the position of the throttle valve or by controlling the air flow through an idle bypass passageway that extends around the throttle valve. These idle speed controlling methods generally result in rather poor idle speed running and idle speed control because of the fact that the adjustment of the idle air flow takes place a substantial distance away from the combustion chambers.

It is, therefore, a still further object of this invention to try to provide an improved method and apparatus for controlling idle speed through the use of an air assist system.

It has been previously noted that an important feature of the invention resides in the ability to use the air assist to control the direction of fuel flow into the combustion chamber. As has been noted, however, under certain circumstances, the air charge that enters the combustion chamber is at a low velocity and in low amounts. This gives rise to incomplete combustion and other associated problems.

It is, therefore, a still further object of this invention to employ an air assist system for an engine that can be employed for introducing turbulence into the combustion chamber under certain running conditions.

In addition to increasing the velocity of air flow into the combustion chamber to increase turbulence, it is also desirable to provide a system wherein the direction of air flow in the combustion chamber can be controlled. Various flow controlling systems have been proposed for this purpose. One disadvantage with such flow controlling systems is that in order to induce turbulence in the combustion chamber the intake passage is restricted and hence the high-speed performance of the engine can be deteriorated.

It is, therefore, a still further object of this invention to employ an air-assisted system for an engine where the air assist can be employed to generate the desired type of flow pattern in the combustion chamber depending upon the engine running condition.

As has been noted, one type of air assist system for multi-cylinder engines employs a sequentially operated valve for sequentially supplying air to the individual fuel injectors associated with each cylinder. Normally this type of sequential valve is driven in timed relationship with the engine camshaft. Such an arrangement, however, does not permit the attainment of a number of the objects which have been aforenoted.

It is, therefore, a still further object of this invention to provide an improved control valve for an air-assisted fuel injection system wherein the timing and duration of the air assist may be controlled.

SUMMARY OF THE INVENTION

A first feature of this invention is adapted to be embodied in an internal combustion engine having an induction system for delivering a charge to a combustion chamber of the engine. A fuel injector is provided for injecting a fuel spray into the induction system. Means are provided for injecting a stream of air at a pressure not substantially greater than atmospheric into the induction system and in proximity to the area where the fuel spray passes. A control valve is provided for controlling at least one of the timing and duration at which the stream of air is injected.

Another feature of the invention is adapted to be embodied in an apparatus for injecting fuel into an internal combustion engine and is comprised of a fuel injector having a spray nozzle for discharging a spray of fuel. A fitting is fixed relative to the fuel injector and defines a channel through which at least a portion of the spray of fuel from the fuel injector passes. Means are provided for delivering air into the channel in a path to atomize the fuel delivered from the fuel injector and for redirecting the fuel spray.

Another feature of the invention is adapted to be embodied in an internal combustion engine having a combustion chamber and an intake passage communicating with the combustion chamber through an intake port. An intake valve controls the flow through the intake port and is opened and closed in relation to the engine cycle. An auxiliary intake passage opens into the intake passage in a direction toward the intake port. Means deliver air through the auxiliary intake passage for only a portion of the time when the intake valve is opened.

A further feature of the invention is adapted to be embodied in an internal combustion engine having a plurality of cylinders. At least one intake passage serves each of the cylinders through a respective intake port. A plurality of intake valves each controls the flow through a respective one of the intake ports. A camshaft is provided for operating the intake valves. Each of a plurality of auxiliary intake passages intersects a respective one of the intake passages and are directed toward the respective intake port. Control valve means are driven in timed relationship to the camshaft for controlling the opening and closing of the auxiliary intake passages.

A still further feature of the invention is adapted to be embodied in a control valve means for use with an internal combustion engine having a configuration as described in the preceding paragraph. In this feature, the control valve is comprised of a valve body having an air supply passage which is delivered to each of a plurality of valving segments. Each valving segment has a valving portion that cooperates with a respective one of the auxiliary intake passages for controlling the flow through that auxiliary intake passage.

BRIEF DESCRIPTION OF THE DRAWINGS

FIG. 7 is an enlarged cross-sectional view of the distributor valve shown in cross section in FIG. 1 and taken along a plane parallel thereto.

FIG. 8 is a cross-sectional view taken along the line 8—8 of FIG. 7.

FIG. 9 is a cross-sectional view taken along the line 9—9 of FIG. 8.

FIG. 10 is a cross-sectional view taken along the line 10—10 of FIG. 7.

FIG. 11 is a cross-sectional view, in part similar to FIG. 7, showing a distributor valve constructed in accordance with another embodiment of the invention.

FIG. 12 is a cross-sectional view taken along the line 12—12 of FIG. 11.

FIG. 13 is a cross-sectional view taken along the line 13—13 of FIG. 12, showing the distributor valve in one of its extreme positions.

FIG. 14 is a cross-sectional view, in part similar to FIG. 13, and shows the distributor valve of this embodiment in the other extreme position.

FIG. 15 is a cross-sectional view taken along the line 15—15 of FIG. 11.

FIG. 16 is a cross-sectional view, in part similar to FIGS. 8 and 12, and shows another embodiment of the invention.

FIG. 17 is a cross-sectional view taken along the line 17—17 of FIG. 16 and shows the distributor valve in a first position.

FIG. 18 is a cross-sectional view, in part similar to FIG. 17, and shows the distributor valve in another position.

DETAILED DESCRIPTION OF THE PREFERRED EMBODIMENTS OF THE INVENTION

Figure 1:
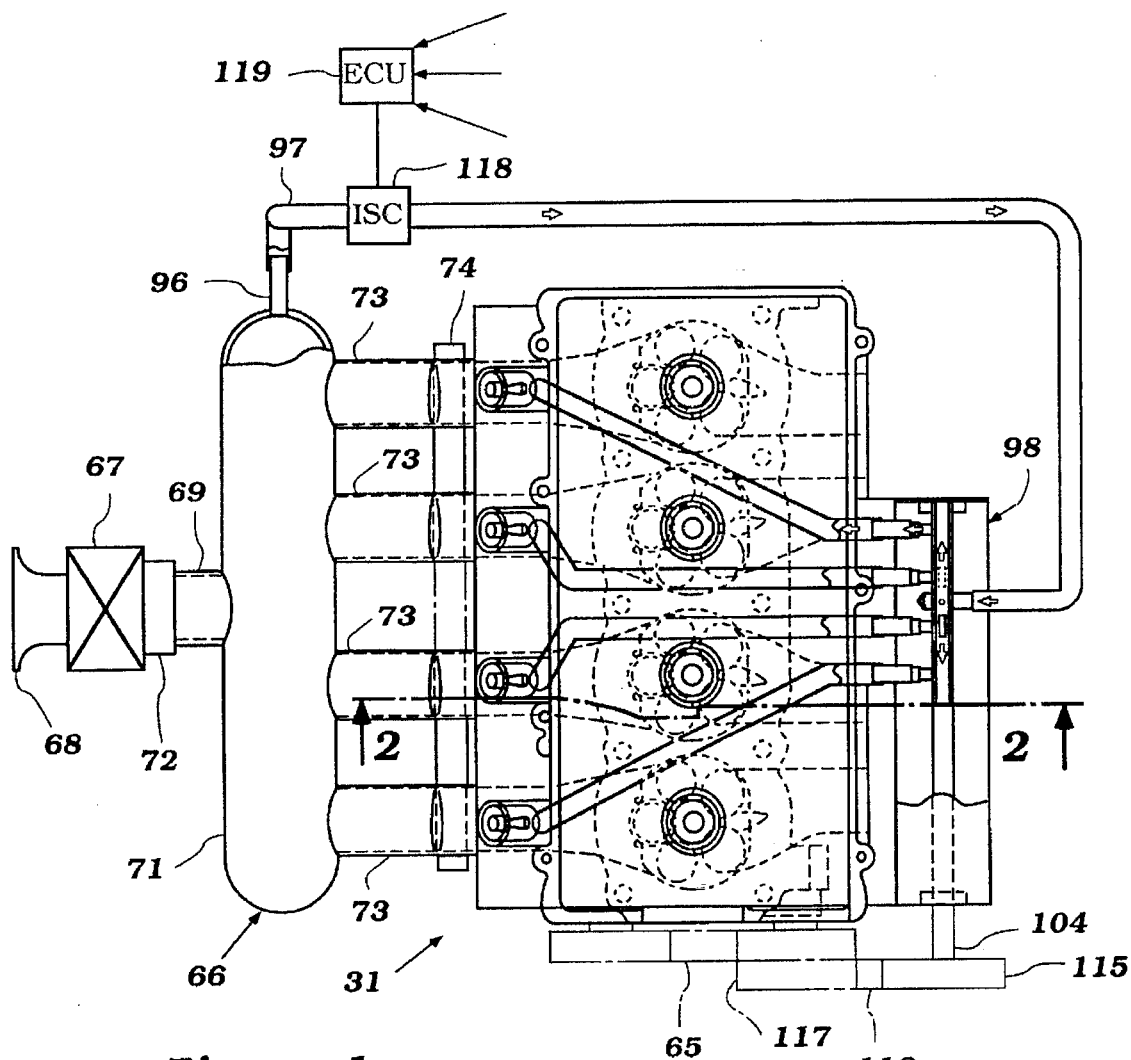
FIG. 1 is a top plan view of an internal combustion engine constructed in accordance with a first embodiment of the invention, with portions broken away and shown in section and other portions shown schematically.

Referring first to the embodiment of FIGS. 1–9, an internal combustion engine constructed in accordance with this embodiment is indicated generally by the reference numeral 31. Since the invention deals primarily with the induction system and the fuel injection system for the engine 31, the components of the engine 31 which are conventional or which may be of any known conventional structure are shown only partially and will be described only summarily. Reference may be had to any prior art engine for the basic construction of an engine with which the invention may be practiced. However, and as will become apparent, the invention does have particular utility in conjunction with high-performance engines having multiple valves per cylinder, and in the illustrated embodiment as will become apparent, the engine 31 is provided with five valves per cylinder.

The engine 31 is comprised of a cylinder block 32 which, in the illustrated embodiment, is formed with four cylinder bores 33 in which pistons 34 reciprocate. Although the invention is described in conjunction with a four-cylinder in-line type of engine, it will be readily apparent to those skilled in the art how the invention may be utilized with engines having other cylinder numbers and other cylinder configurations. By way of example only, the cylinder block 32 may be of the V-type, and the illustrated arrangement may comprise that of one bank of two angularly disposed banks of cylinders with the induction system being disposed in the valley between the cylinder banks.

The pistons 34 are connected by means of connecting rods (not shown) to a crankshaft, which is also not shown, in a known manner. As has been noted, the invention deals primarily with the induction system and fuel injection system for the engine 31 and, for that reason, further description of the lower end of the engine will not be made.

A cylinder head, indicated generally by the reference numeral 35, is affixed to the cylinder block 32 in any well-known manner. The cylinder head 35 has individual recesses 36 which cooperate with the cylinder bores 33 and pistons 34 to define the combustion chambers of the engine 31.

One side of the cylinder head 35 is formed with Siamesed-type intake passages, indicated generally by the reference numeral 37, each of which has a common inlet opening 38 in an outer side surface 39 of the cylinder head 35. This passage 37 branches into a center portion 41 and a pair of side portions 42 and 43 that terminate at respective valve seats. These valve seats comprise a center valve seat 44 and a pair of side valve seats 45 and 46.

Although the invention is described in conjunction with an engine having three intake valves per cylinder served by a Siamesed-type intake passage, it will be readily apparent to those skilled in the art how the invention may be applied with engines having separate intake passages and with different numbers of intake valves including only one intake valve per cylinder. However, certain facets of the invention have particular utility in conjunction with multi-valve engines, and particularly with those embodying Siamesed intake passages for reasons which will become apparent.

A center intake valve 47 and a pair of side intake valves 48 cooperate with the valve seats 44 and 45 and 46, respectively, to control the flow therethrough. These intake valves are each supported in the cylinder head 35 by respective valve guides 49 that are cast or pressed in place. The orientation of the intake valves 47 and 48 and configuration of the intake passage 37 may be of the type described in the copending application entitled "Engine Air Intake Device," Ser. No. 08/354,539, filed Dec. 13, 1994, in the name of Masaaki Yoshikawa, and assigned to the assignee hereof. Also, the shape of the combustion chamber may be as defined in that application, and the disclosure of that application is incorporated herein by reference. Again, it is to be understood that this configuration is only one of many with which the invention may be practiced.

Coil compression springs 51 encircle the stems of the respective intake valves 47 and 48 and act against the cylinder head 35 and keeper retainer assemblies (not shown) affixed to the stems of the valves 47 and 48 for urging them to their closed positions. Thimble tappets 52 are slidably supported in the cylinder head 35 and are engaged by the lobes 53 of an intake camshaft 54 for opening the intake valves 47 and 48. The intake camshaft 54 is journalled in the cylinder head 35 for rotation in a suitable manner and is driven at one-half crankshaft speed by a suitable timing drive.

The induction system which supplies the intake charge to the cylinder head intake passages 37 will be described later.

On the side of the cylinder head 35 opposite from the intake passages 37 there are provided exhaust passages 55 which, like the intake passages 37, may be either Siamese or separate. These exhaust passages 55 extend from valve seats 56 formed in the cylinder head 35 and terminate in an outer surface 57 of the cylinder head 35 which is disposed opposite to the surface 38 through which the intake passages 37 extend. An exhaust manifold (not shown) is affixed to the cylinder head surface 57 for collecting the exhaust gases and discharging them to the atmosphere through any suitable exhaust system.

A pair of exhaust valves 58 are slidably supported in the cylinder head 35 by pressed or cast-in valve guides 59. The axes of reciprocation of the exhaust valves 58 may also be as described in the aforenoted copending application, Ser. No. 08/354,539.

Coil compression springs 61 encircle the stems of the exhaust valves 58. These springs 61 act against keeper retainer assemblies (not shown) affixed to the upper ends of the stems of the exhaust valves 58 and surfaces of the cylinder head 35 for urging the exhaust valves 58 to their closed positions.

Thimble tappets 62 are slidably supported in bores in the cylinder head 35 and engage the keeper retainer assemblies for actuating the valves 58. The thimble tappets 62 are, in turn, operated by the lobes 63 of an exhaust camshaft 64 that is rotatably journalled in the cylinder head 35 in a known manner. Like the intake camshaft 54, the exhaust camshaft 64 is driven by a suitable drive from the crankshaft of the engine at one-half crankshaft speed. A portion of this drive appears in FIG. 1 and is identified by the reference numeral 65. This speed reduction may take place in one or more stages from the crankshaft, as noted in the aforenoted application.

The engine 31 as thus far described may be considered to be the same as that disclosed in copending application Ser. No. 08/354,539. Alternatively, the invention may be employed in conjunction with any conventional type of engine. As has been noted, the invention deals primarily with the induction system and fuel injection system for the engine 31, and this induction system is indicated generally by the reference numeral 66.

The induction system 66 is comprised of an air inlet device 67 having an inlet opening 68 through which atmospheric air is drawn. The air inlet device 67 may include a filter element and a mechanism of any known type for silencing the air which is inducted. This air is then delivered to the inlet conduit 69 of a plenum chamber 71 which extends along one side of the engine adjacent the cylinder head surface 38. An air flow meter 72 is interposed between the air inlet device 67 and the plenum chamber inlet 69 and measures the volume of air flowing through the engine for the engine management system. Except as will be noted, this engine management system may be of any known type.

The plenum chamber 72 has branch outlets 73 which extend to a throttle body 74 which has individual passages 75, each of which communicates with a respective one of the cylinder head intake passages 37 for delivering the air flow from the induction system 66 to the combustion chambers of the engine. A throttle valve shaft 76 extends transversely through the throttle body 74 and has butterfly-type throttle valves 77 affixed to it in each passage 75 for controlling the flow therethrough. These throttle valves 77 and the throttle valve shaft 76 are actuated in a known manner.

Each of a plurality of fuel injectors, indicated generally by the reference numeral 78, is mounted in the cylinder head 35 in a manner to be described for spraying a fuel charge into the intake passages 37. The fuel injectors 78 may be of any conventional type, and preferably are the type that are provided with an electrically operated injector valve which, when actuated, causes a spray of fuel to be emitted from the nozzle portion of the fuel injector 78. A fuel rail (not shown) is affixed to the injector 78 for supplying fuel to them at a regulated pressure, as is well known in this art.

In accordance with an important feature of the invention, the fuel injectors 78 have their nozzle portions 79 mounted in insert pieces, indicated generally by the reference numeral 81, which are received in bores 82 formed in the outer end of the cylinder head surface 39 adjacent to and intersecting the induction passages 37. The bores 82 are, in fact, counterbores formed at the outer end of a smaller diameter fuel passage 83 which extends to and intersects the intake passage 37.

These insert pieces 81 are formed with a cylindrical recess 84 adjacent their outer periphery and which is sealed relative to the counterbore 82 by means of O-rings received in sealing grooves 85 and 86 formed on opposite sides of the recess 84. This recess 84 therefore forms an air chamber 87 to which air is supplied at atmospheric pressure in a manner which will be described later.

The insert piece 81 is formed with a first bore 88 that is complementary to and which receives the nozzle portion 79 of the fuel injector 78. An O-ring seal 89 is received in a groove formed around the bore 88 and effects a fluid-type seal between the insert piece 81 and the injector nozzle portion 79.

Figure 4:
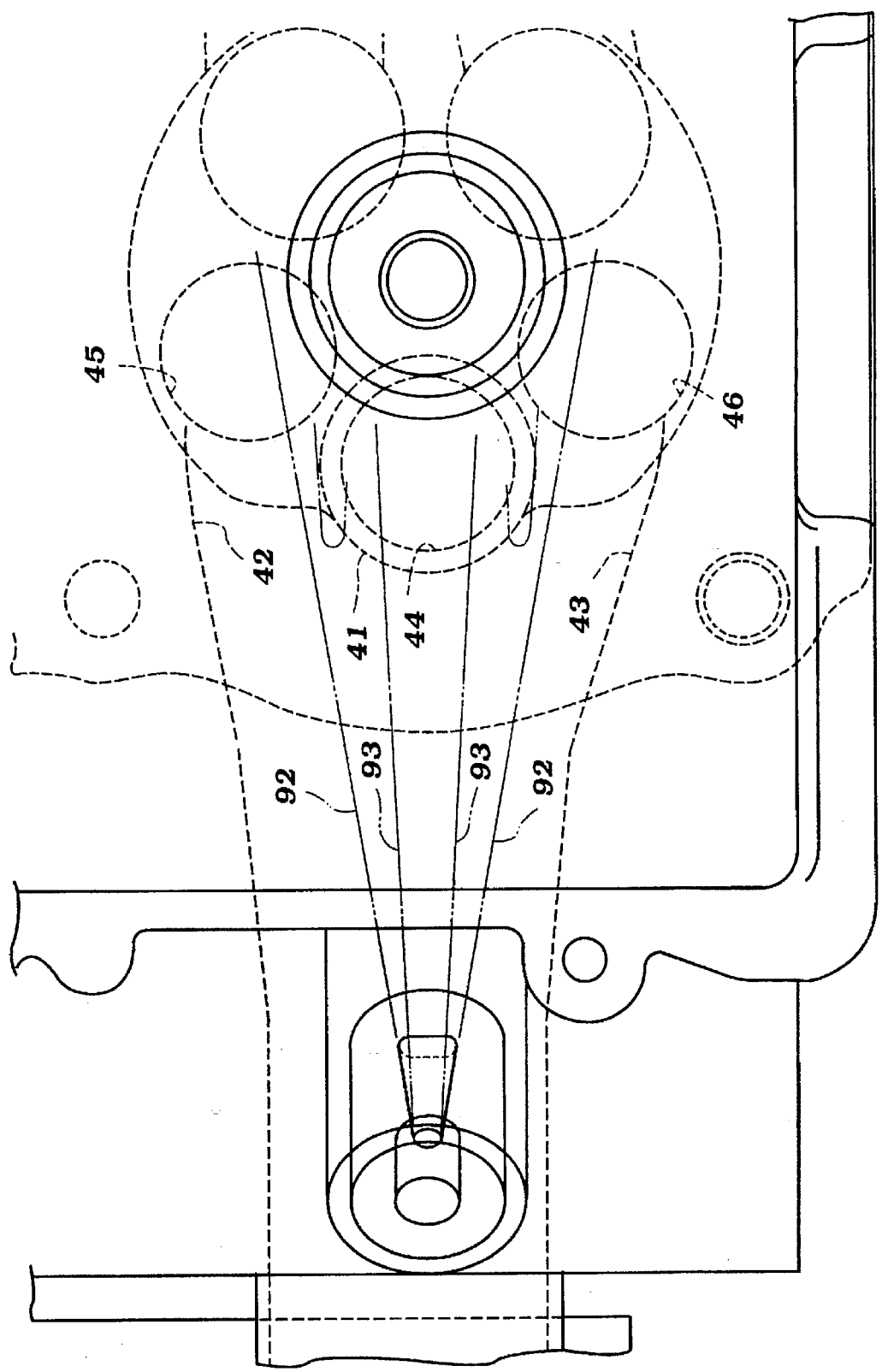
FIG. 4 is an enlarged top plan view of the area shown in FIG. 3 and is in part similar to FIG. 1.
Figure 5:
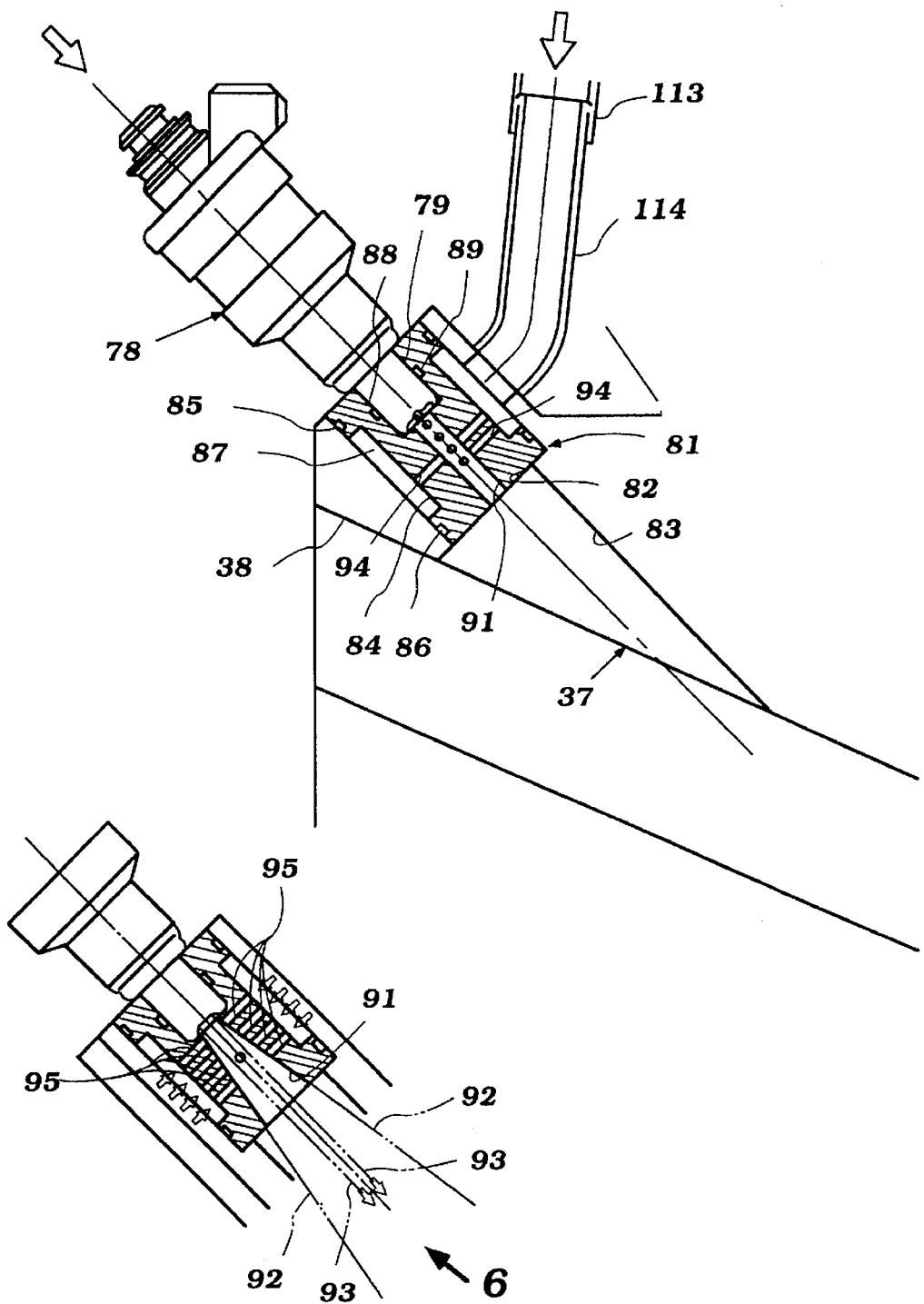
FIG. 5 is a cross-sectional view taken along the line 5—5 in FIG. 3.
Figure 6:
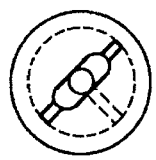
FIG. 6 is an end elevational view looking in the direction of the arrow 6 in FIG. 5.

At the base of the bore 88, the insert piece 81 is formed with a fuel discharge passage 91 which has a configuration as best shown in FIGS. 3–6 and which is oval shaped at its discharge end, as clearly shown in FIG. 6, and which tapers generally outwardly from the bore 88 in which the injector nozzle portion 79 is received. As may be best seen in FIG. 4, the taper of the discharge port 91 of the insert piece 81 is configured so that a fan-type path exists from the fuel injector nozzle 79 toward the intake passage portions 41, 42, and 43. This fan-shaped path is defined between the phantom lines 92 in FIG. 4, and it will be seen that it encompasses both the center intake valve seat 44 and the adjacent portions of the side intake valve seats 45 and 46.

In accordance with the invention, however, the air which is introduced along with the fuel is introduced through a plurality of openings which will be described and which are configured so as to direct and confine the fuel spray from the nozzle, which fuel spray path is indicated by the phantom lines 93 in FIGS. 4 and 5. In this way the air that is injected along with the fuel can be employed to control the spray path, and this spray path can be altered during engine running by changing the timing of the introduction of air through these ports, as will also be described.

In the illustrated embodiment, there are provided a first series of air ports 94 (FIG. 3) which are disposed on the narrow side of the fuel discharge opening 91, and thus have only a small amount of control over the fuel discharge path. However, on the plane perpendicular to this plane, as seen in FIG. 5, there are provided a plurality of openings 95 on opposite sides of the flow path through which the air will flow, as shown by the arrows in FIG. 5 and which will confine the fuel spray to the narrower path 93 than that of the air flow path 92 from the discharge opening 91. Thus, the fuel may be controlled so that it will primarily flow through the center intake valve seat 44 when the air pressure is introduced at the time when the injector 78 is discharging.

On the other hand, if the air is introduced at a time other than when the injector 78 is discharging fuel, then the fuel will pass through the larger spray path, indicated by the lines 92, and be delivered through not only the center intake valve seat 44, but also through the side valve seats 45 and 46. Therefore, by controlling the time of the introduction of air through the insert piece 81, the spray path of the injector 78 can be controlled during engine running. This permits the attainment of stratification under certain running conditions as desired. This concept may be employed in conjunction with an air flow control of the type as also described in the aforenoted copending application, Ser. No. 08/354,539, so as to further improve engine performance.

The system for supplying the air for the assist in the operation of the fuel injector 78 will now be described by primary reference to FIGS. 1–3, and 7–10. This system draws air from the plenum chamber 71 through a fitting 96 and conduit 97 to a control valve assembly, indicated generally by the reference numeral 98. This control valve assembly 98 has an inlet fitting 99 to which the conduit 97 is affixed. The fitting 99 is affixed to a main body portion 101 of the control valve 98. A bore 102 interconnects the fitting 98 with a longitudinally extending bore 103 formed in the valve body 101.

A rotary-type control valve element 104 is journalled suitably in the body 101. End seals 105 provide a seal between the valve element 104 and the body 101. This valve 104 has a longitudinally extending blind bore 106 which extends of sufficient length to encompass four distributor passages 107, one for each cylinder which the control valve 98 serves. The outer end of the blind bore 106 is closed by a closure plug 108.

The bore 106 of the valve element 104 receives air from the housing bore 102 through a plurality of radially extending drillings 109 which are formed in the valve element 104 in aligned relationship with the bore 102.

In addition to the openings 109 that permit air to enter into the bore 106 of the valve element 104, the valve element 104 is also provided with a plurality of axially spaced slotted openings 111, one for each discharge port 107. The openings 111 will, when in registry with the openings 107, permit air to flow through the valve element 104 to discharge fittings 112 of the valve housing 101. These discharge fittings 112 are connected to individual conduits 113 that extend across the engine and which are connected to fittings 114 fixed in the cylinder head 35 and which communicate with the recesses 87 formed by the insert pieces 81.

Hence, when the opening 111 of the control valve 104 is in its registering position with the respective fitting 107, then air will be introduced into the induction system through the insert piece 81. This air is at substantially atmospheric pressure, and thus will be at a higher pressure than the pressure in the intake passages 37 when the respective intake valves 47 and 48 are open. As a result, there will be a pressure differential, and the air that is introduced through the insert piece 81 will flow at a higher velocity than the air in the intake passage 37 because of its higher pressure, at least during initial opening of the intake valves 47 and 48. This will help in not only atomizing the fuel injected by the fuel injector 78, but also will be useful in controlling the spray path, as aforenoted. In addition, this air flow can be utilized to minimize pumping losses, control internal EGR, control engine idle operation and for a variety of other purposes, as will be described.

Figure 2:
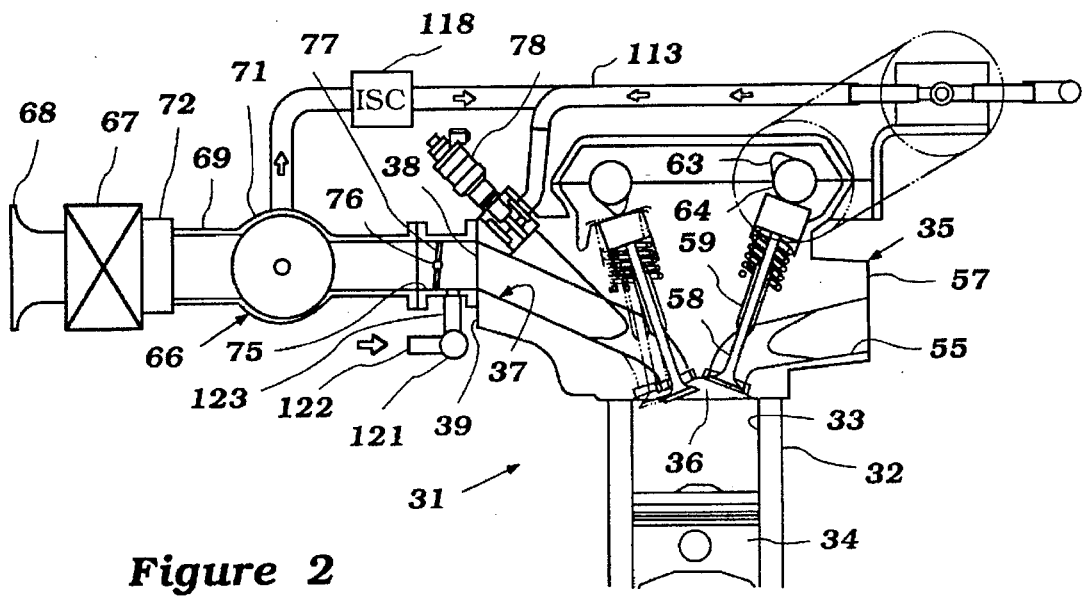
FIG. 2 is a partial cross-sectional view taken along the line 2—2 of FIG. 1.
Figure 3:
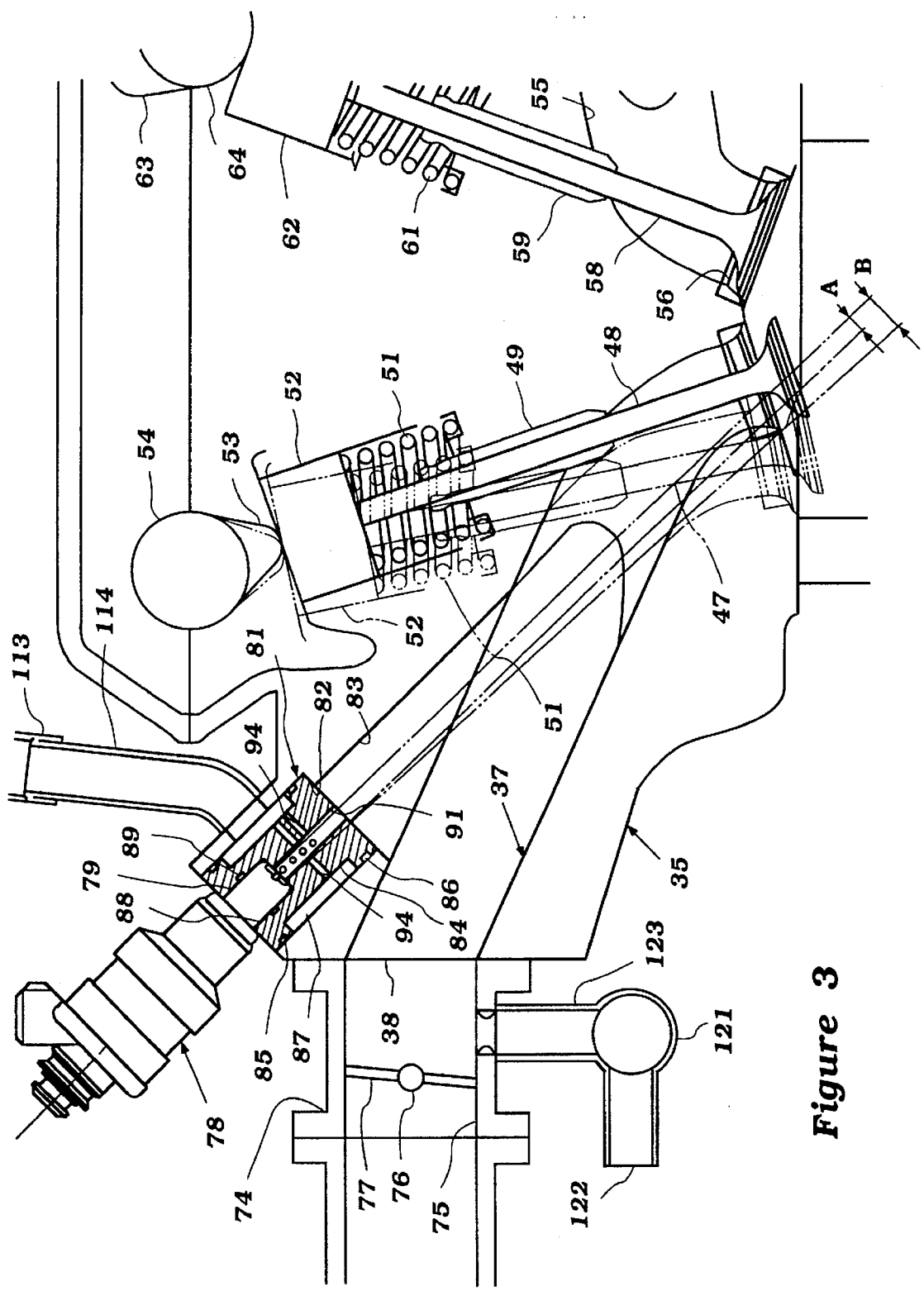
FIG. 3 is an enlarged cross-sectional view taken along the same plane as FIG. 2.

In order to control the timing and duration of the air assist, the valve element 104 is driven from the drive for one of the camshafts, the exhaust camshaft 64 in this embodiment, as shown in FIGS. 1 and 2. To this end, a pulley 115 is affixed to the exposed end of the valve shaft 104 and is driven by a toothed belt 116 from the exhaust camshaft 64. A pulley 117 is affixed to the exhaust camshaft adjacent its drive 65 for driving the toothed belt 116. The drive for the valve shaft 104 may include any known type of variable valve timing mechanism for changing the timing at which the individual flow control ports 111 register with their controlled openings 107 for controlling the timing of the air assist. The duration of the air assist may be controlled by selecting the circumferential width of the slots 111.

It should also be noted that the slots 111 are circumferentially spaced around the axis of the valve element 104, and this is done so as to correspond with the respective intake cycles for each of the cylinder bores 33 and the time when their respective intake valves 47 and 48 are activated. As will also be described, the air assist may begin at any time when the intake valves 47 and 48 are opened and, in fact, may begin before they are opened so as to reduce pumping losses.

In this embodiment of the invention, the air assist is also employed for controlling the idle speed and idle operation of the engine. Thus, in the conduit 97 there is provided an idle speed control valve, which is shown schematically and indicated by the reference numeral 118. This idle speed control valve 118 is operated by an ECU 119 in any desired control strategy. As is well known in the art, such idle speed control valves are employed to vary the amount of air supplied to the engine during idling operation, and thus provide fine tuning for engine idle speed. Since this idle speed control valve 118 is positioned downstream of the air flow meter 72, the amount of air flowing to the system during idle will also be measured, and accurate control of the fuel injection amount is also possible.

Finally, the engine 31 is provided with a crankcase ventilation system that includes a crankcase ventilating manifold 121 which receives crankcase gases from a conduit 122 and supplies them through discharge portions 123 into the throttle body 74, and specifically its passages 75 downstream of the flow controlling throttle valve 77.

In the embodiment of the invention as thus far described, the air assist system is capable of changing the timing of the opening and closing of the additional air supply through the control valve 98. In some instances it may also be desirable to be able to change the duration of air assist, and FIGS. 11–15 show a first embodiment of flow control valve that achieves this end. Since this is the only difference between this embodiment and that of FIGS. 1–10, only the flow control valve is illustrated and is identified generally by the reference numeral 151. The flow control valve 151 has a valve body 152 which, like the previously described embodiment, is provided with an inlet fitting 153 that communicates with a source of air at substantially atmospheric pressure.

The fitting 153 communicates with a radially extending passageway 154 formed in the valve body 152 and which intersects an axially extending bore 155. A control valve element 156 is rotatably journalled within this bore 155 and is formed with a hollow interior 157. This hollow interior communicates with the source of air pressure through a plurality of circumferentially spaced passages 158 that are axially aligned with the housing bore 154, so that air at atmospheric pressure will be present in the hollow interior of the valve element 156.

Unlike the previously described embodiment, the valve element 156 is supported for axial movement in the housing bore 155. A coil compression spring 159 is received in a housing extension 161 and bears against a bearing member 162 which engages a closure plug 163 fixed to the valve element 156 so as to normally urge it into abutment with one end of the housing 152. A seal 164 seals the valve element 156 at this end of the housing.

The opposite end of the valve element 156 has a male splined portion 165 that is received within a female spline opening 166 of a valve element driving shaft 167. This driving element 167 is rotatably journalled in the opposite end of the housing 152 and has a pulley (not shown) connected to its outer end for driving through a variable valve timing mechanism from one of the camshafts of the engine in the manner previously described.

A sliding piston 168 is received at the base of the female splines 166 and defines a pressure chamber 169 in which a further coil compression spring 171 is received. The spring 171 is lighter than the spring 169, so that the valve element 156 will be normally urged to the position shown in FIG. 11. This position is also shown in FIG. 13.

In order to pressurize the chamber 169 and effect axial movement of the valve element 156 to change the duration of air injection, the chamber 169 is communicated with a source of pressure such as the oil pump 172 of the engine. The oil pump 172 is shown schematically in this figure and communicates with a passageway 173 in the housing 156 that communicates with the chamber 169 through a plurality of circumferentially spaced passages 174 drilled in the driving shaft 167.

A return passageway 175 also communicates with the chamber 169 through a plurality of circumferentially spaced ports 176. A control valve 177 controls the communication of the passageway 175 to the oil tank 178 of the engine. When the control valve 177 is actuated to close the return passageway 175, then the pressure in the chamber 169 will raise, and the valve element 156 will be urged in the direction of the arrow 179 so as to effect a change in the duration of air injection.

Rather than the single slotted openings for controlling the communication of the interior 157 of the valve element 156 with the air injectors, the valve element 156 is provided with a plurality of stepped openings having a narrow portion 181 which gives a short duration and a larger portion 182 which gives a longer duration of air assist. These slots 181 and 182 communicate with respective passages 183 formed in the housing 152. These openings 183 are aligned with the slots 181 and 182, but are narrower than the combined width of the slots 181 and 182. The housing openings 183 have an axial length that is slightly less than the length of the individual slotted portions 181 and 182, as clearly shown in FIGS. 13 and 14.

The slotted openings 183 in the housing 152 communicate with respective fittings 184 to which flexible conduits 185 are connected. The conduits 185 communicate with the insert pieces 81, as previously described, and for that reason this connection is not illustrated in these figures.

When the desired control strategy requires a short duration of air assist, then the control valve 177 is maintained in its opened condition so that there will be little fluid pressure in the chamber 169 and the valve element 156 will be held in the position shown in FIGS. 11 and 13. However, when the control strategy requires a longer duration, the control valve 177 is closed so that the valve element 156 will be moved in the direction of the arrow 179 to the position shown in FIG. 14. In this condition there is a longer duration of air assist. As previously noted, the reasons for these variations in engine performance will be described later.

A control valve constructed in accordance with a further embodiment of the invention is illustrated in FIGS. 16–18. This control valve is indicated generally by the reference numeral 201 and differs from the control valve of the embodiment of FIGS. 11–15 in that it provides a continuously variable duration, rather than a stepped duration, as that earlier embodiment. Since this is the only difference between this embodiment and that of FIGS. 11–15, only three figures are necessary to illustrate this embodiment, and these three figures correspond to FIGS. 12, 13, and 14, respectively, of the earlier embodiment.

Since the variation in duration is achieved only by changing the configuration of the slot, indicated generally by the reference numeral 202, and all other components are the same, where the components are the same, they have been identified by the same reference numerals and will not be described again. As may be seen, the slot 202 has a continuous taper from one end to the other. Therefore, by changing the axial position of the valve element 156, it is possible to vary continuously the duration of air assist. Since this is the only difference from the previously described embodiment, and since the axial movement can be achieved by a mechanism as described in conjunction with the embodiment of FIGS. 11–15, further description of the operation of this embodiment is not believed to be necessary to permit those skilled in the art to practice the invention.

As has been noted, conventional air-assisted injection systems utilize the air primarily for assisting in the dispersion of the fuel and the atomization of the fuel, as well as mixing it with the air. However and as has already been noted, the air assist may be employed for other purposes, such as redirecting the fuel spray or changing the spray pattern during engine running. In addition, the air can be utilized to control the idle speed, reduce pumping losses, and generate turbulence in the combustion chamber. This is possible in part due to the type of control valves which are employed and which have been shown in the embodiments of FIGS. 1–9, 10–15, and 16–18.

Figure 19:
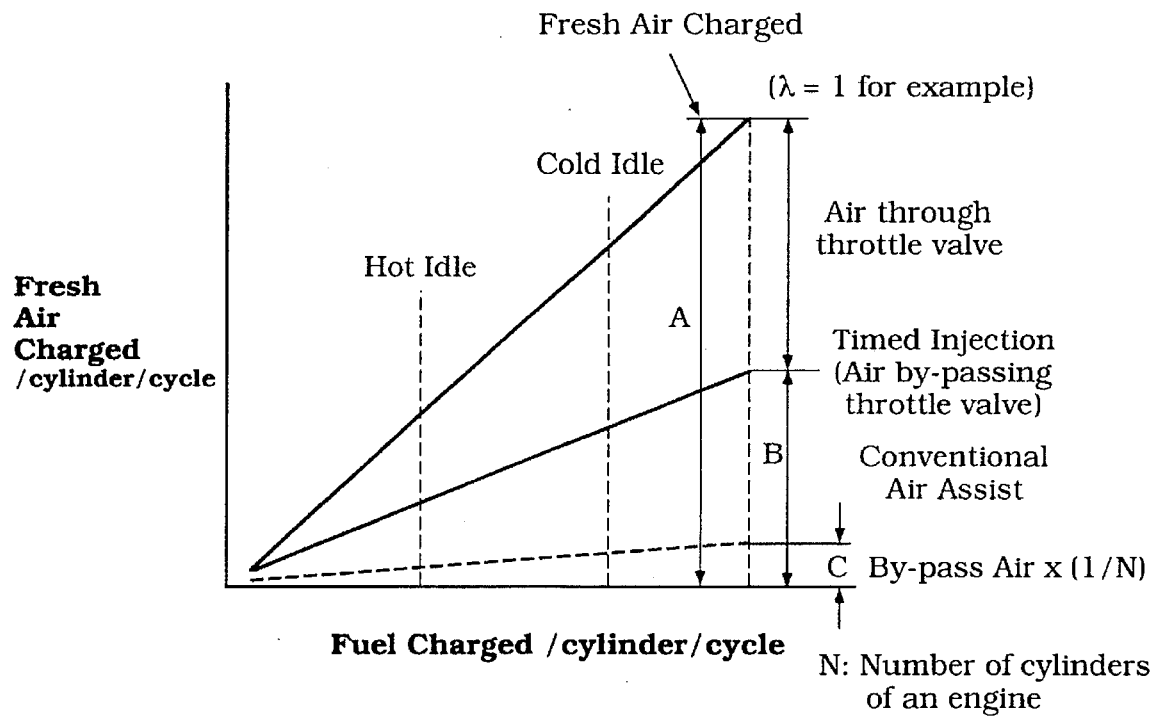
FIG. 19 is a graphical view showing the amount of fuel and amount of air supplied per cylinder per cycle in conjunction with a conventional air-assisted system and one constructed in accordance with the invention.

FIG. 19 is a view showing how this type of valve permits a greater amount of air flow for the air assist system than the previously employed control valves utilized in air assist systems, if any control valve at all is used. The previously employed control valves with air systems have operated like rotary valves where the ports supplied are sequentially registered with a single opening in the rotating valve element. As a result of this, not only is the amount of air available for air assist limited, but the timing and duration cannot be easily changed.

FIG. 19 is a graphical view wherein the dotted line shows the amount of conventional air assist in relation to fuel charged and total air charge for the engine. The amount of air available with the conventional type of valve is indicated at C, and this is the total amount of bypass air divided by the number of cylinders. With this invention, however, the amount of air available is substantially greater, as indicated at B, and this can be a substantial portion of the total air which passes through the throttle valve for the engine. In fact, at idle, the total air supplied for idle operation can at times be supplied only through the air assist system if this is desired.

Figure 20:
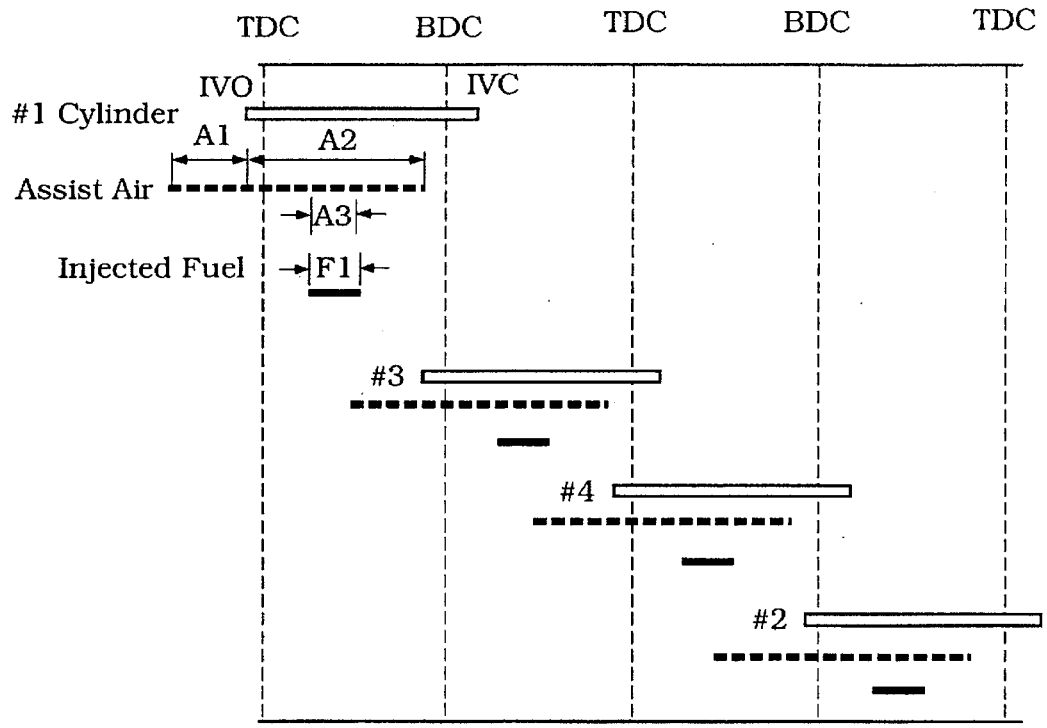
FIG. 20 is a timing diagram showing the intake valve opening, air assist discharge, and fuel injection discharge to explain operational methods that may be practiced with the invention.

Referring now to FIG. 20, this is a timing chart for a four-cylinder engine and shows the timing during slightly more than two complete revolutions of the crankshaft, and specifically the intake events. The intake valve opening and closing for each cylinder is shown, and the engine is described as having a firing order 1-3-4-2, a fairly typical firing order for a four-cylinder engine.

The fuel injection F1 takes place from the fuel injectors 78 at a time approximately midway between the intake valve opening and intake valve closing. Of course, the duration of fuel injection will vary under varying running conditions, and the time interval shown is just typical of a particular engine running condition and is depicted to show the various concepts that can be employed.

The air assist time intervals are shown, with the total air assist in this particular embodiment being shown by a broken-line view that begins at a time period A1 before intake valve opening. This air assist before intake valve opening causes the engine to experience less pumping losses. The reason for this is that when the intake valve normally opens and without air assist, the pressure in the induction system upstream of the intake valve, and specifically in the intake passage 37, may still be less than atmospheric because of the fact that the time since the previous intake valve opening is so small that the pressure has not had a chance to stabilize. Thus, by introducing air at atmospheric pressure during the time period A1, the pumping losses will be reduced, and also, the amount of internal EGR that takes place will be reduced. Thus, by varying the time period A1, pumping losses can be reduced and the amount of internal EGR can be controlled.

The time period when air assist takes place once the intake valve is opened also can be employed to create turbulence in the combustion chamber. Because of the fact that the assist air is at a higher pressure than the inducted air, the velocity of this air will be greater. Also, since the flow area through which the assist air is introduced is smaller, the high-velocity charge can also be directed through the shape of the passageway in which the air is injected. This can cause desired motions in the combustion chamber, depending upon the direction. Either swirl or tumble or both can be generated by appropriately directing the air charge.

The assist air A3 that flows when the fuel is injected also, as previously noted, is effective in breaking up the fuel particles and causing them to atomize or vaporize.

It should be noted that the pumping loss problem is one that is particularly attendant with engines wherein there is an individual throttle valve for each cylinder head intake passage, as with the embodiments thus far described. An embodiment having a common throttle valve for all intake passages will be described later by reference to FIGS. 24 and 25.

Figure 21:
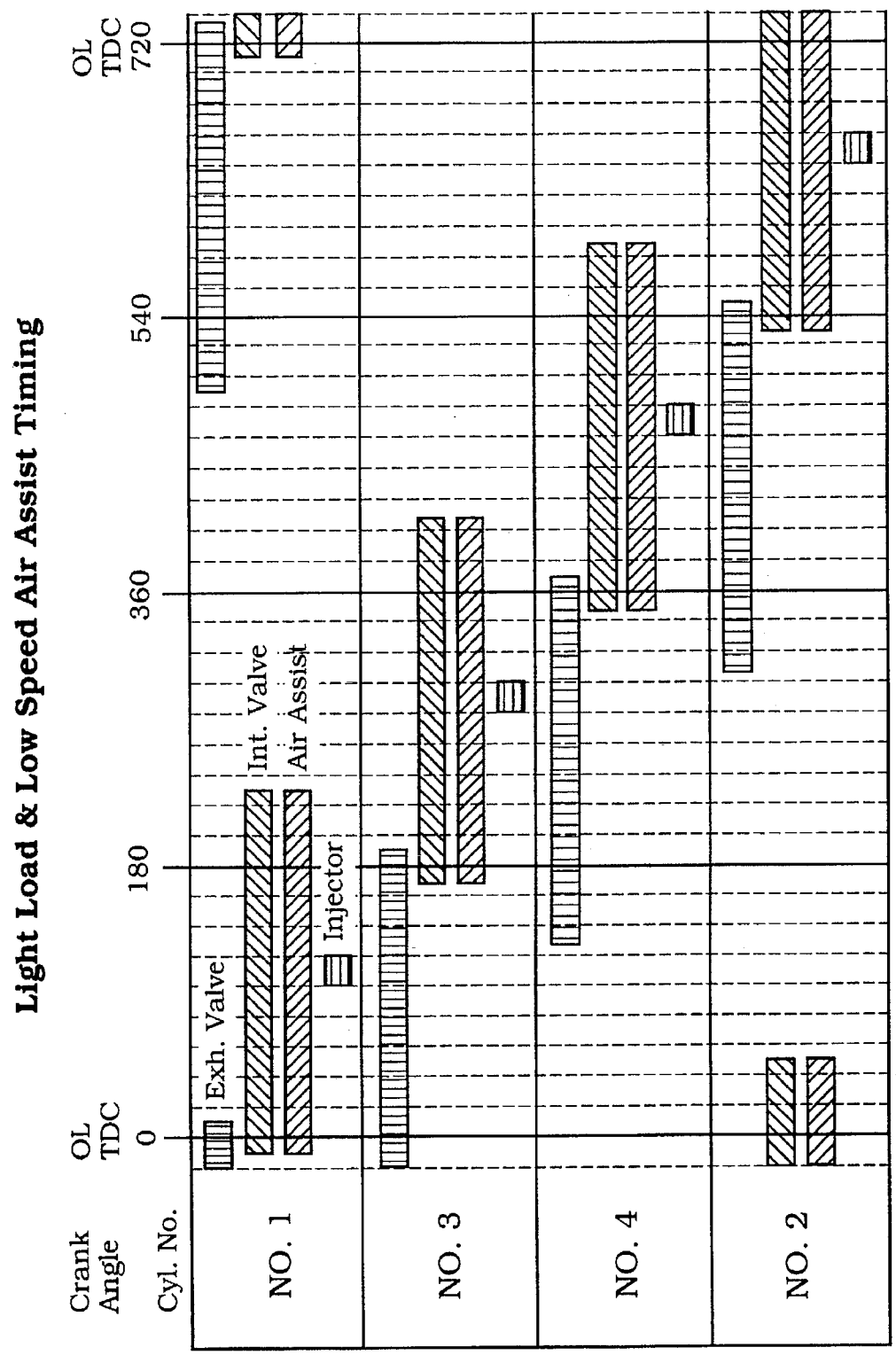
FIG. 21 is a timing diagram, in part similar to FIG. 20, and shows another embodiment of the invention and also shows the relationship of the opening of the exhaust valve relative to the intake valve.

FIG. 21 is a timing diagram that is partially similar to FIG. 20, but this also shows the events of the exhaust valve and wherein the air assist is effective in reducing internal EGR under light load and low-speed conditions. By causing air assist to take place all of the time when the intake valve is opened, and particularly during the time period when the exhaust valve still is open, internal EGR will be substantially eliminated. Of course, at some times some internal EGR may be required or desired, and this can be promoted by delaying the beginning of air assist.

Figure 22:
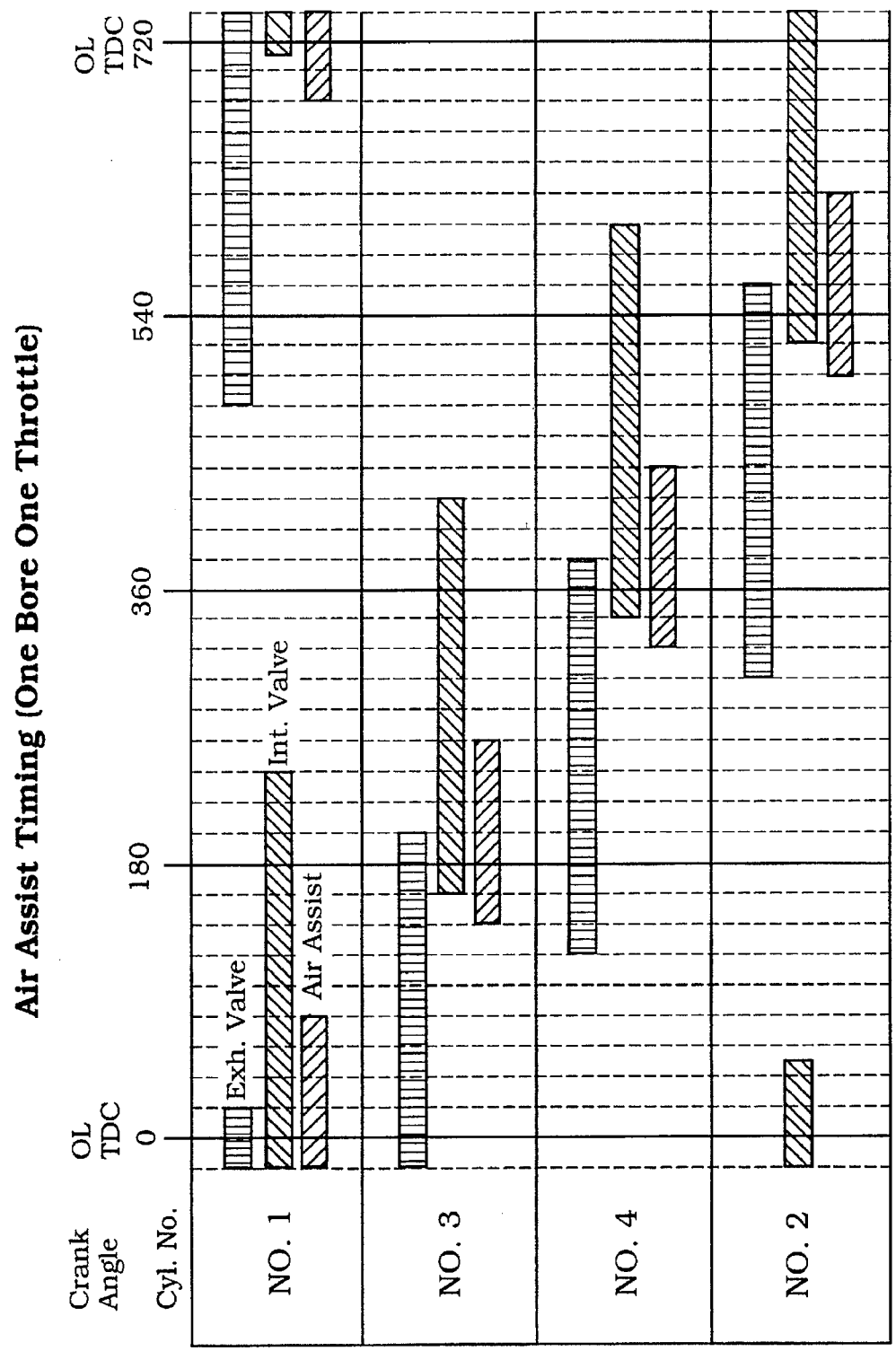
FIG. 22 is a graphical view, in part similar to FIGS. 20 and 21, and shows a further operational mode that may be practiced in conjunction with the invention.

FIG. 22 is a timing diagram, in part similar to that of FIG. 20, but also shows the opening of the exhaust valve. This arrangement is particularly useful where there is a single throttle valve for each intake passage of the engine and wherein pumping losses and internal EGR can become a greater problem. By advancing air assist so that it begins before the intake valve is opened, pumping losses can be reduced, as can the amount of internal EGR.

Figure 23:
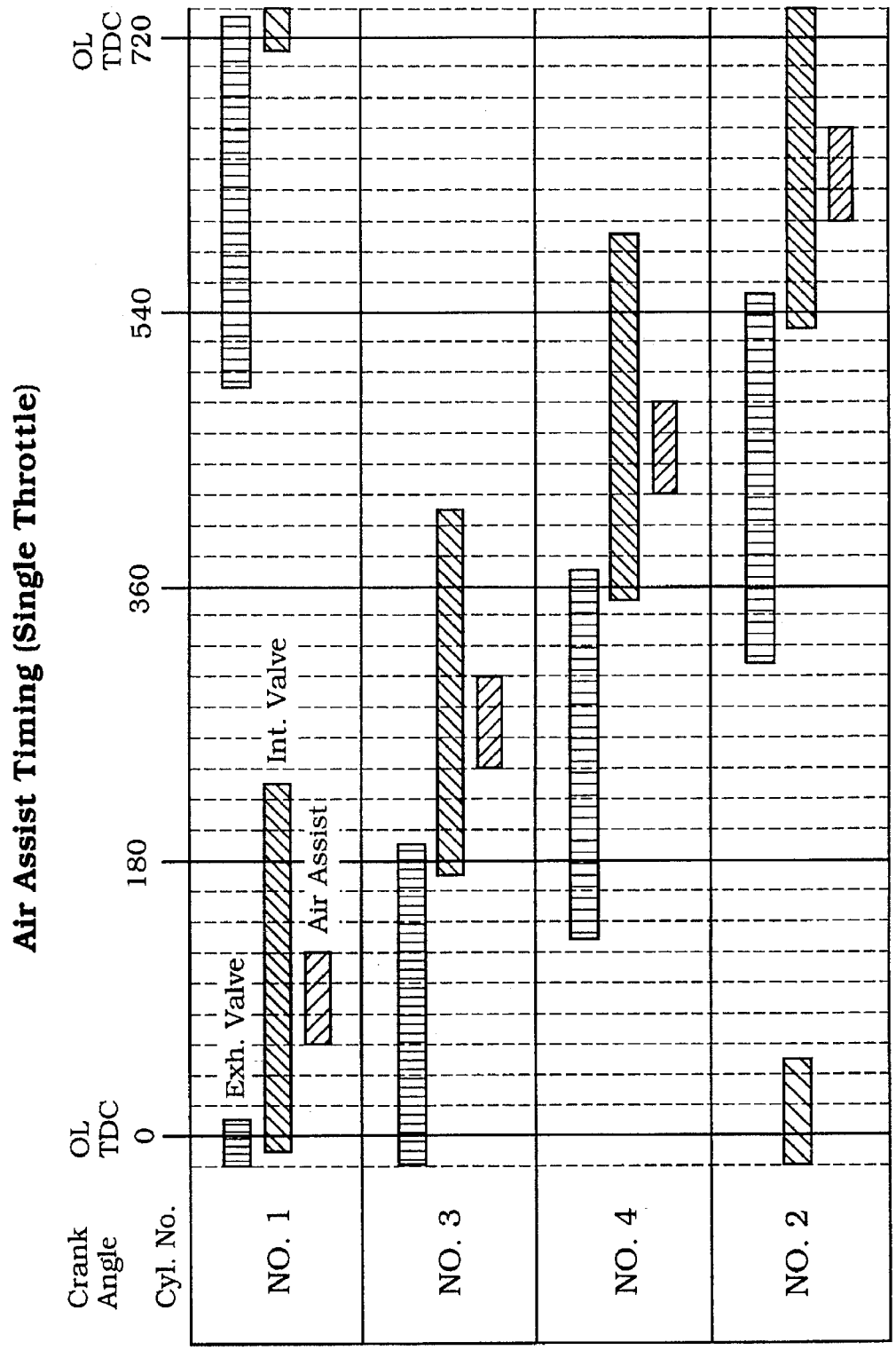
FIG. 23 is a graphical view, in part similar to FIGS. 20, 21, and 22, and shows another operational mode that may be employed in conjunction with the invention.

In engines having a single throttle valve positioned upstream from the individual cylinder head intake passages and controlling the total air flow, there is less rapid response to changes in throttle position, but the pumping loss and internal EGR problems are somewhat less. With such engines, a timing diagram, as shown in FIG. 23, can be employed wherein the air assist time period is either the same as the fuel injection time or only slightly longer than the fuel injection time. Of course, this eliminates the advantage of increasing turbulence in the combustion chamber, and it may be desired to utilize longer air assist periods or earlier air assist periods, even in such engines so as to generate turbulence to improve combustion at low speeds and low loads.

Figure 24:
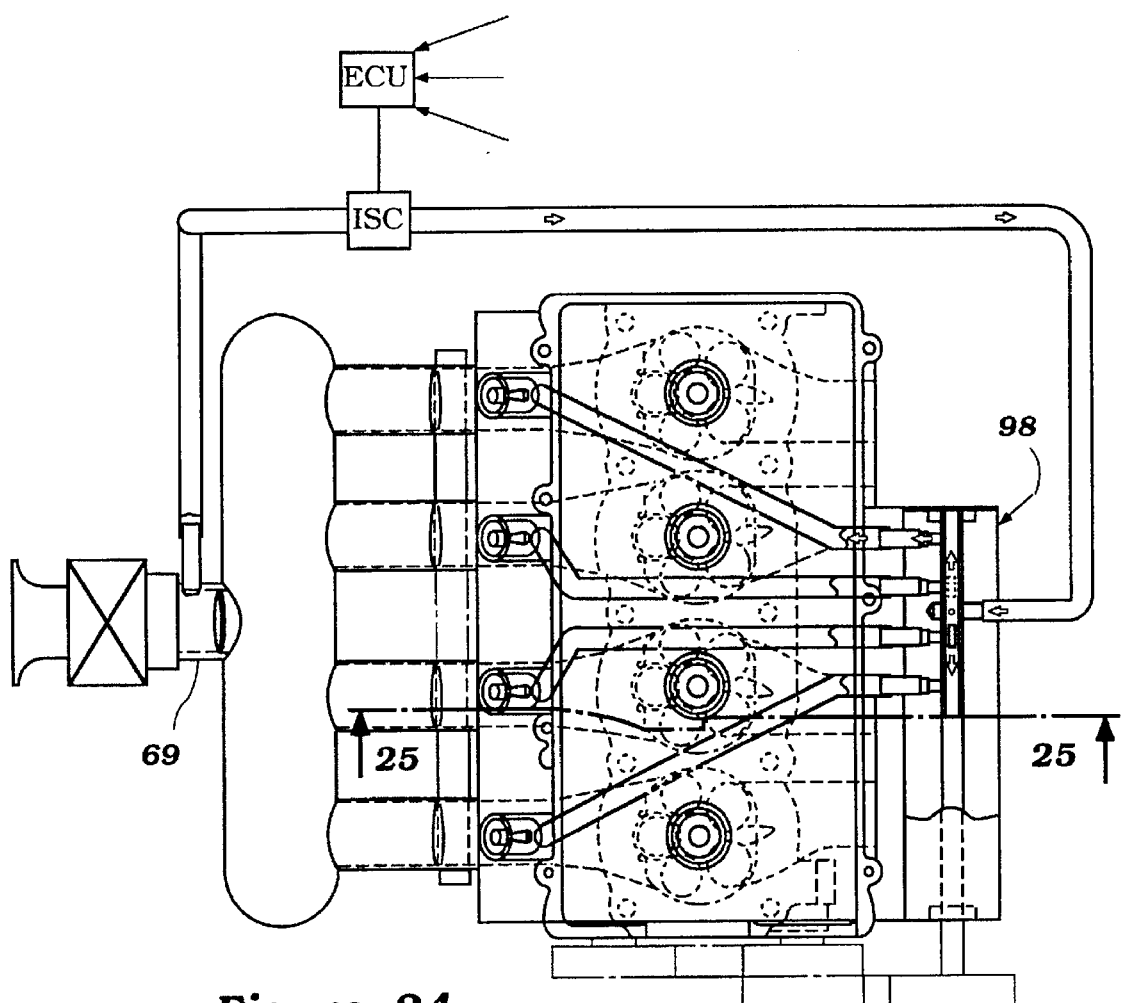
FIG. 24 is a top plan view, in part similar to FIG. 1 and shows a further embodiment of the invention.
Figure 25:
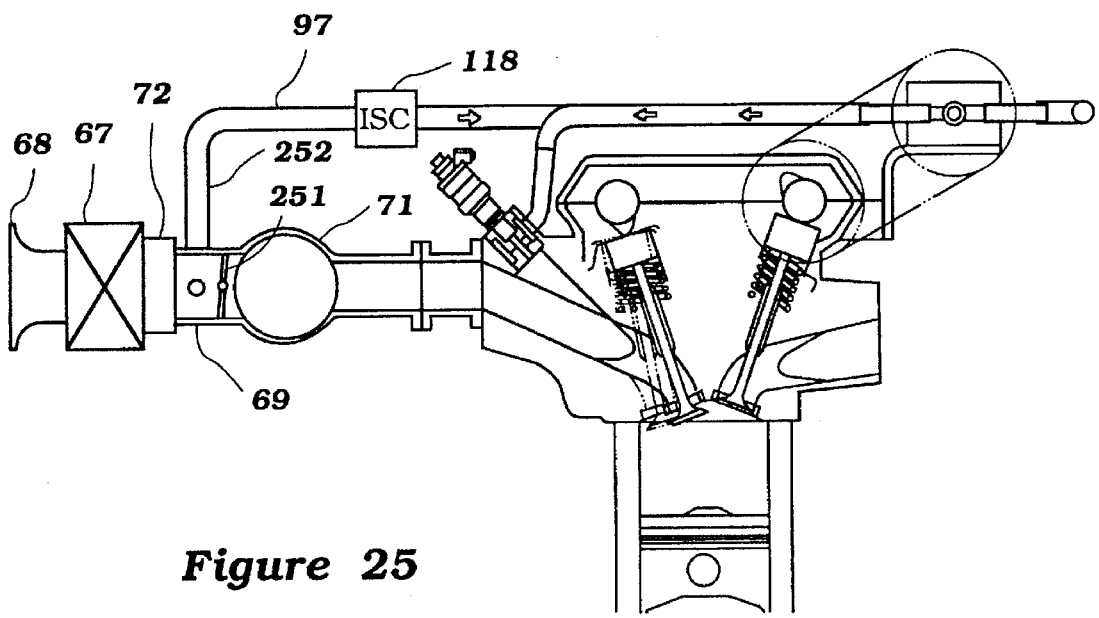
FIG. 25 is a cross-sectional view taken along the line 25—25 of FIG. 24.

As has been noted, the invention is susceptible of use with engines having a single throttle valve for controlling the air flow to a multitude of cylinders. FIGS. 24 and 25 show such an embodiment. This embodiment differs from the embodiment of FIGS. 1–10 only in the throttle control for the engine, and since all other components are the same as that previously described, they have been identified by the same reference numerals and will not be described again.

In this embodiment, the throttle body 74 may be retained or may be totally eliminated. However, a single flow controlling throttle valve, indicated generally by the reference numeral 251, is mounted in the inlet portion 69 of the plenum chamber 71. Thus, the throttle valve 251 is still downstream of the air flow meter 72, and hence, all air flowing to the engine will have passed through the air flow meter 72 so that the amount of fuel injected can be accurately controlled in relation to the actual air flow.

With this embodiment, since the throttle valve 69 is positioned upstream of the plenum chamber 71, the conduit for the air assist system is provided with an inlet 252 that is upstream of the throttle valve 251 in the plenum chamber inlet 69. However, this fitting 252 is still downstream of the air flow meter 72. The conduit 97 going to the idle speed control valve 118 and to the air control valve 98 is connected to this fitting 251. In all other regards, this embodiment is constructed and operates the same as those previously described, and for that reason, further description is not believed to be necessary.

Figure 26:
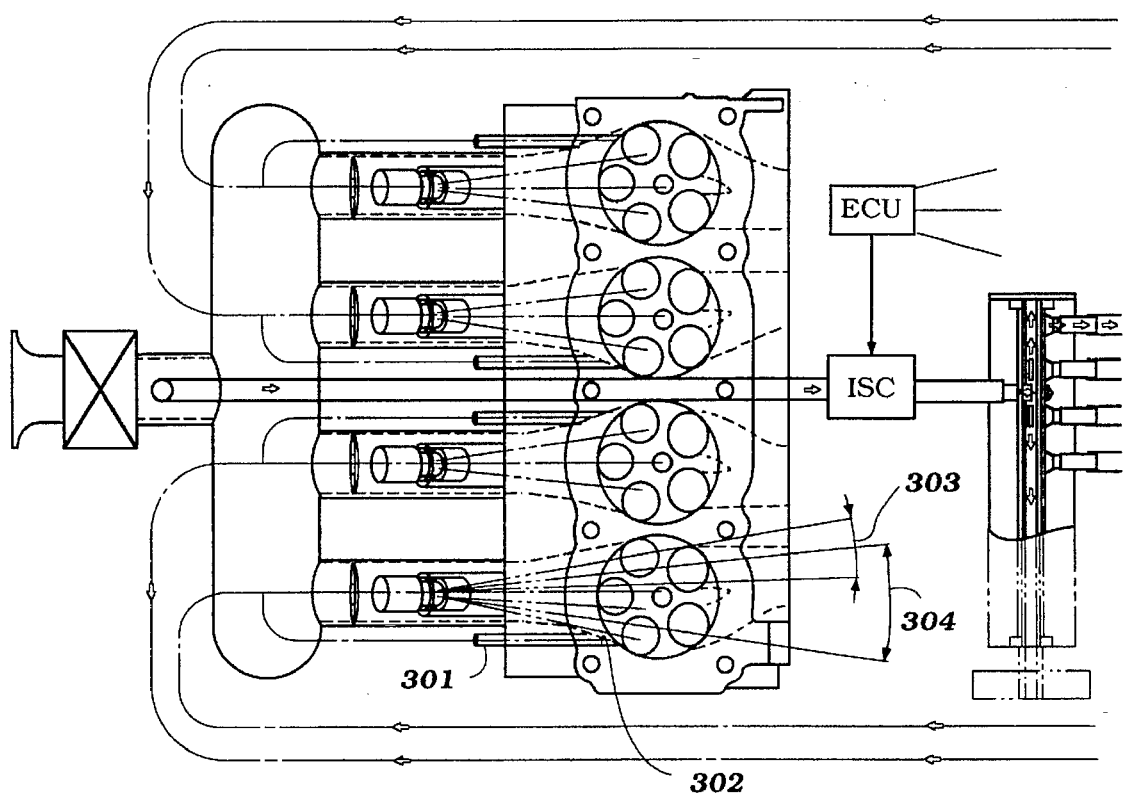
FIG. 26 is a top plan view, in part similar to FIGS. 1 and 24, and shows a further embodiment of the invention.
Figure 27:
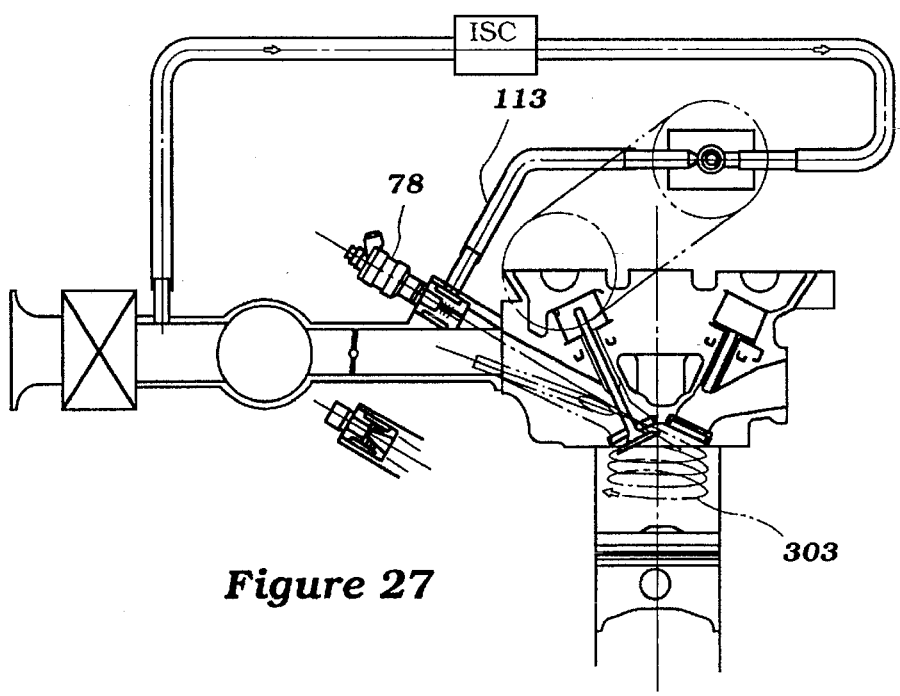
FIG. 27 is a cross-sectional view taken along the line 27—27 of FIG. 26.

It has been noted that one of the uses of the assist air may be to create turbulence in the combustion chamber. Although this can be done by introducing the air through the insert piece 81 of the previously described embodiments, the assist air may be introduced separately into the intake passage in addition to through this insert piece. FIGS. 26 and 27 show another embodiment of the invention wherein a separate air passage is provided in addition to that of the insert piece. This embodiment is generally the same as the embodiment of FIGS. 1–10, and where components are the same or substantially the same as that embodiment, they have been identified by the same reference numerals and will not be described again.

In this embodiment, the control valve 98 is driven off of the intake camshaft rather than the exhaust camshaft, as with the previously described embodiments. This is really not significant unless there is a variable valve timing mechanism employed between the crankshaft and the camshafts. If such is the case, then it is desirable to drive the control valve 98 off of the intake valve, even if there is a variable valve timing mechanism between the control valve 98 and the camshaft which drives it, the intake camshaft 24 in this embodiment.

Also, the crankcase ventilation system does not discharge into the induction system in this particular embodiment.

In addition to supplying air to the insert pieces 81 through the conduits 113, there is provided a branch conduit 301 that communicates with a swirl passage 302 formed in the cylinder head and which intersects one of the side intake passages 42 or 43 on one side thereof. Thus, the swirl ports 302 will introduce a swirling motion, as shown by the arrow 303 in FIG. 27 when the intake valve is opened. This swirling motion will cause turbulence in the combustion chamber, which is particularly useful at low-speed, low-load conditions. Turbulence has been found to improve flame propagation and ensure complete combustion.

It should be noted that the fuel injector 78 of this embodiment is of the dual-nozzle type. Each nozzle has a spray pattern, indicated by the arc 303 in FIG. 26, so that the combined spray pattern of the two nozzles is greater than that of a single nozzle, as indicated by the arc 304. In all other regards, this embodiment is the same as those previously described, and various timing arrangements can be employed for achieving desired purposes.

Figure 28:
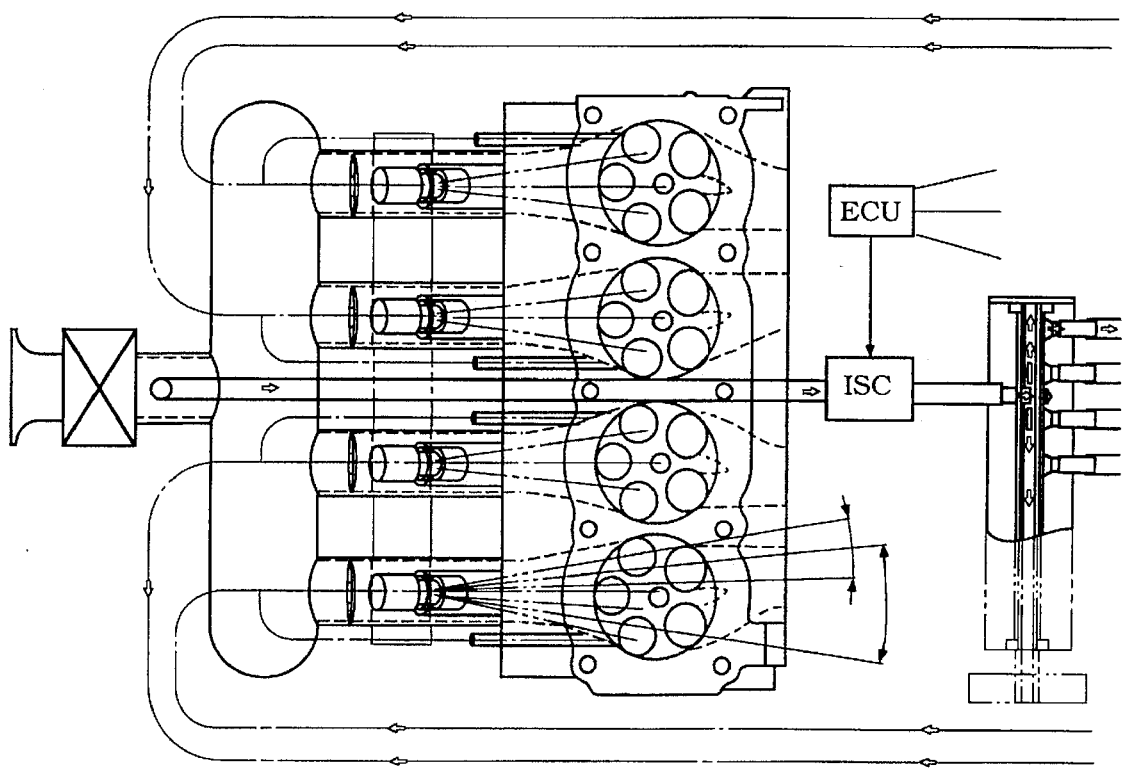
FIG. 28 is a top plan view, in part similar to FIGS. 1, 24, and 26, of a yet further embodiment of the invention.
Figure 29:
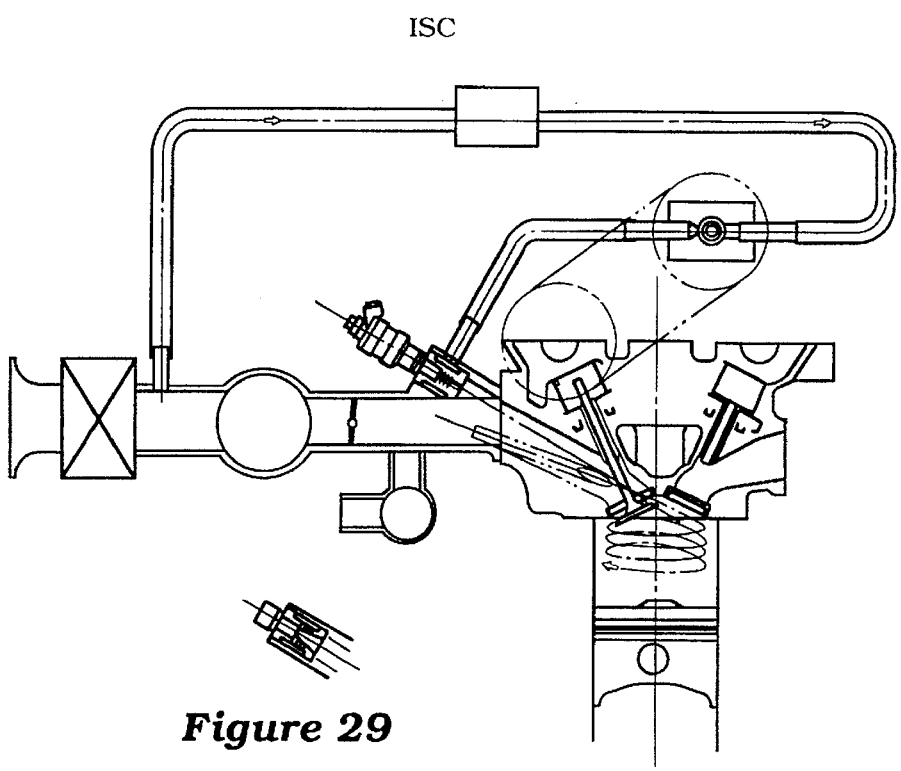
FIG. 29 is a cross-sectional view taken along the line 29—29 of FIG. 28.

FIGS. 28 and 29 show another embodiment of the invention which is the same as that of FIGS. 26 and 27, but also adds the crankcase ventilation system, as used in the embodiment of FIGS. 1–10 and which has, therefores been identified by the same reference numerals as applied in those figures.

It should be readily apparent from the foregoing description that the described embodiments of the invention provide an air-assisted fuel injection system wherein the air is employed not only to disperse and atomize the fuel, but can be employed for other purposes such as controlling idle speed, reducing pumping losses, inducing turbulence in the combustion chamber to improve flame propagation, controlling internal EGR, and various other purposes. These results are achieved, at least in part, due to the use of the novel control valves that control the auxiliary air flow. Of course, the foregoing description is that of preferred embodiments of the invention. Various changes and modifications may be made without departing from the spirit and scope of the invention as defined by the appended claims.

I claim:

1. An internal combustion engine having an induction system for delivering a charge to a combustion chamber to said engine, a fuel injector for injecting a fuel spray into said induction system, means for directing a stream of air at a pressure not substantially greater than atmospheric into said induction system, and control valve means for controlling the timing and duration at which said stream of air is injected, and means for adjusting at least one of the timing and duration of the supply of air through said control valve means during the running of the engine, at least a portion of the air being injected before said fuel injector begins its fuel injection, and at least a portion of the air is injected at the time when said fuel injector is injecting fuel and wherein at least that portion of air is directed toward said fuel spray passing from the fuel injector for mixing with the fuel, at least a portion of the air injected is into the induction system in a direction to induce a swirling motion in the combustion chamber.

2. An internal combustion engine as set forth in claim 1, wherein the air injected is injected in part in a path to intersect the fuel sprayed from the fuel injector and further including a supplemental air passage disposed to one side of the intake port.

3. An internal combustion engine having an induction system for delivering a charge to a combustion chamber to said engine through an intake port, timing means for opening and closing said intake port, a fuel injector for injecting a fuel spray into said induction system, means for directing a stream of air at a pressure not substantially greater than atmospheric into said induction system, and control valve means for controlling the timing and duration at which said stream of air is injected, and means for adjusting at least one of the timing and duration of the supply of air through said control valve means during the running of the engine so that at least a portion of the air is injected before the intake port is open.

4. An internal combustion engine as set forth in claim 3, wherein the flow through the intake port is controlled by an intake valve.

5. An internal combustion engine as set forth in claim 4, further including an exhaust passage communicating with the combustion chamber through an exhaust port and an exhaust valve for opening and controlling the flow through the exhaust port.

6. An internal combustion engine as set forth in claim 5, wherein at least a portion of the air is injected at a time when both the intake port and the exhaust port are open.

7. An internal combustion engine as set forth in claim 3, wherein the air injected is into the induction system in a direction to induce a swirling motion in the combustion chamber.

8. An internal combustion engine as set forth in claim 7, wherein the air injected is injected in part in a path to intersect the fuel sprayed from the fuel injector and further including a supplemental air passage disposed to one side of the intake port.

9. An internal combustion engine as set forth in claim 8, wherein the flow of air through both the supplemental air passage and in the path of fuel spray from the fuel injector is controlled by a common control valve element.

10. An internal combustion engine as set forth in claim 3, wherein the induction system terminates in a plurality of intake ports each serving the same combustion chamber and each controlled by a respective poppet valve.

11. An internal combustion engine as set forth in claim 10, wherein the fuel injector injects fuel into the induction system upstream of the intake ports.

12. An internal combustion engine as set forth in claim 11, wherein the induction system has a common portion serving at least two of the intake ports and wherein the fuel injector injects fuel into the common portion.

13. An internal combustion engine as set forth in claim 12, wherein there are three intake ports and three intake poppet valves.

14. An internal combustion engine as set forth in claim 13, wherein the fuel injects fuel into the induction passage at a common portion that serves each of the intake ports.

15. An internal combustion engine having a plurality of cylinders, at least one intake passage serving each of said cylinders through a respective intake port, a plurality of intake valves each controlling the flow through a respective one of said intake ports, a cam shaft for operating said intake valves, a plurality of auxiliary intake passages each intersecting a respective one of said intake passages and directed toward a respective intake port, and control valve means driven in timed relationship to said cam shaft for controlling the opening and closing of said auxiliary intake passage, said control valve means having a flow controlling slot having variable width for controlling the air flow.

16. An internal combustion engine as set forth in claim 15, wherein the air injected is into each induction system in a direction to induce a swirling motion in the respective combustion chamber.

17. An internal combustion engine as set forth in claim 16, wherein the auxiliary intake passage is disposed to none side of the intake port.

18. An internal combustion engine as set forth in claim 16, wherein each induction passage terminates in a plurality of intake ports each serving the same combustion chamber and each controlled by a respective poppet valve.

19. An internal combustion engine as set forth in claim 18, wherein there are three intake ports and three intake poppet valves for each combustion chamber.

20. An internal combustion engine as set forth in claim 19, wherein the auxiliary intake passage is directed toward only one of the intake ports.

21. An internal combustion engine as set forth in claim 15, wherein the control valve means comprises a rotary valve element.

22. An internal combustion engine as set forth in claim 21, wherein the time of injection of air into the intake system serving at least two of the combustion chambers occurs at the same time and at least one other combustion chamber is not supplied with injected air at the same time.

23. An internal combustion engine as set forth in claim 22, wherein the control valve means comprises a plurality of controlling portions each axially spaced from the others along the axis of rotation of the control valve and each serving a respective induction system.

24. An internal combustion engine as set forth in claim 23, wherein the control valve is driven through a variable valve timing mechanism for changing at least the timing of the control valve.

25. An internal combustion engine as set forth in claim 23, wherein the control valve is provided with a plurality of flow controlling slots each having a variable effective width.

26. An internal combustion engine as set forth in claim 25, wherein the control valve is driven through a variable valve timing mechanism for changing at least the timing of the control valve.

27. An internal combustion engine having a combustion chamber, an intake passage communicating with said combustion chamber through an intake port, an intake valve for controlling the flow through said intake port and opened and closed in timed relationship to the engine cycle, an auxiliary intake passage opening into said intake passage in a direction toward said intake port, and means for delivering air through said auxiliary intake passage for only a portion of the time when said intake valve is open including means for controlling the timing and duration at which air is injected, means for adjusting at least one of the timing and duration of the supply of air through said control valve means during the running of the engine, said control valve having a flow controlling slot having variable effective length for controlling the air flow.

28. An internal combustion engine as set forth in claim 27, wherein the timing of air injection is adjusted.

29. An internal combustion engine as set forth in claim 27, wherein the duration of air injection is adjusted.

30. An internal combustion engine as set forth in claim 27, wherein the timing and duration of air injection are both adjusted.

31. An internal combustion engine having a combustion chamber as set forth in claim 27, and means for controlling the idle speed of the engine for controlling the amount of air flowing through the auxiliary intake passage.

32. An internal combustion engine as set forth in claim 27, wherein the air injected is into the induction passage in a direction to induce a swirling motion in the combustion chamber.

33. An internal combustion engine as set forth in claim 27, wherein the engine has a plurality of combustion chambers each served by a respective induction passage and injected air stream all controlled by a respective control valve means.

34. An internal combustion engine as set forth in claim 27, wherein the control valve means comprises a rotary valve element.

35. An internal combustion engine as set forth in claim 34, wherein the time of injection of air into the intake system serving at least two of the combustion chambers occurs at the same time and at least one other combustion chamber is not supplied with injected air at that same time.

36. An internal combustion engine as set forth in claim 35, wherein the control valve means comprises a plurality of controlling portions each axially spaced from the others along the axis of rotation of the control valve and each serving a respective induction system.

37. An internal combustion engine as set forth in claim 36, wherein the control valve is driven through a variable valve timing mechanism for changing at least the timing of the control valve.

38. An internal combustion engine as set forth in claim 36, wherein the control valve is provided with a plurality of flow controlling variable effective slots, one for each of the induction system.

39. An internal combustion engine as set forth in claim 38, wherein the control valve is driven through a variable valve timing mechanism for changing at least the timing of the control valve.

40. An internal combustion engine having an induction system for delivering a charge to a combustion chamber to said engine, a fuel injector for injecting a fuel spray into said induction system, means for directing a stream of air at a pressure not substantially greater than atmospheric into said induction system, and control valve means for controlling the timing and duration at which said stream of air is injected, means for adjusting at least one of the timing and duration of the supply of air through said control valve means during the running of the engine, said control valve means further including a throttle valve for controlling the volume of air injected in amounts sufficient for controlling the idle speed of the engine, sensing means for sensing engine speed at least in one speed range, and means for controlling the condition of said throttle valve to maintain a desired idle speed in said one speed range.

41. An internal combustion engine as set forth in claim 40, wherein the timing of air injection is adjusted.

42. An internal combustion engine as set forth in claim 40, wherein the duration of air injection is adjusted.

43. An internal combustion engine as set forth in claim 40, wherein the timing and duration of air injection are both adjusted.

44. An internal combustion engine as set forth in claim 40, wherein at least a portion of the air is injected before the fuel injector begins its fuel injection.

45. An internal combustion engine as set forth in claim 44, wherein at least a portion of the air is injected at the time when the fuel injector is injecting fuel and wherein at least that portion of air is directed toward the fuel spray passing from the fuel injector for mixing with the fuel.

46. An internal combustion engine as set forth in claim 40, wherein at least a portion of the air is injected at a time when the fuel injector is not injecting fuel.

47. An internal combustion engine as set forth in claim 46, wherein at least a portion of the air is injected after the fuel injector discontinues the injection of fuel.

48. An internal combustion engine as set forth in claim 47, wherein at least a portion of the air is injected during the time when the fuel injector is injecting fuel.

49. An internal combustion engine as set forth in claim 40, wherein the air injected is injected in a direction to intersect the path of fuel sprayed by the fuel injector.

50. An internal combustion engine as set forth in claim 49, wherein the air is injected in a direction so as to redirect the spray of fuel from the fuel injector into the combustion chamber.

51. An internal combustion engine as set forth in claim 49, wherein the fuel injector injects fuel into an insert piece having a flow channel and wherein the air is delivered to the insert piece through a plurality of passages extending transversely to the flow channel.

52. An internal combustion engine as set forth in claim 51, wherein the fuel injector is provided with a plurality of fuel injection ports.

53. An internal combustion engine as set forth in claim 40, wherein the engine has a plurality of combustion chambers each served by a respective induction system, fuel injector and injected air stream all controlled by a respective control valve means.

54. An internal combustion engine as set forth in claim 53, wherein the throttle control valve comprises a single throttle control valve for controlling the volume of air flowing into each of the combustion chambers.

55. An internal combustion engine as set forth in claim 53, wherein the control valve means comprises a rotary valve element.

56. An internal combustion engine as set forth in claim 55, further include a cam shaft for operating the poppet valves and means for driving the control valve in timed relationship with the cam shaft.

57. An internal combustion engine as set forth in claim 55, wherein the time of injection of air into the intake system serving at least two of the combustion chambers occurs at the same time and at least one other combustion chamber is not supplied with injected air at that same time.

58. An internal combustion engine as set forth in claim 57, wherein the control valve means comprises a plurality of controlling portions each axially spaced from the others along the axis of rotation of the control valve and each serving a respective induction system.

59. An internal combustion engine as set forth in claim 58, wherein the control valve is driven through a variable valve timing mechanism for changing at least the timing of the control valve.

60. An internal combustion engine as set forth in claim 58, wherein the control valve is provided with a plurality of flow controlling slots, one for each of the induction system and wherein the slots have a variable effective width.

61. An internal combustion engine as set forth in claim 60, wherein the control valve is driven through a variable valve timing mechanism for changing at least the timing of the control valve.

* * * * *